(12) United States Patent
Kim et al.

(10) Patent No.: US 10,514,775 B2
(45) Date of Patent: Dec. 24, 2019

(54) ELECTRONIC DEVICE AND A CONTROL METHOD THEREOF

(71) Applicant: KOREA ELECTRONICS TECHNOLOGY INSTITUTE, Seongnam-si, Gyeonggi-do (KR)

(72) Inventors: Kunnyun Kim, Yongin-si (KR); Wion Hyo Kim, Yongin-si (KR); Yeonhwa Kwak, Seoul (KR); Kwang Bum Park, Yongin-si (KR)

(73) Assignee: KOREA ELECTRONICS TECHNOLOGY INSTITUTE, Seongnam-si, Gyeonggi-do (KR)

( * ) Notice: Subject to any disclaimer, the term of this patent is extended or adjusted under 35 U.S.C. 154(b) by 687 days.

(21) Appl. No.: 15/038,429

(22) PCT Filed: Dec. 20, 2013

(86) PCT No.: PCT/KR2013/011917
§ 371 (c)(1),
(2) Date: May 20, 2016

(87) PCT Pub. No.: WO2015/093666
PCT Pub. Date: Jun. 25, 2015

(65) Prior Publication Data
US 2016/0299578 A1 Oct. 13, 2016

(30) Foreign Application Priority Data
Dec. 19, 2013 (KR) .................. 10-2013-0159360

(51) Int. Cl.
G06F 3/0346 (2013.01)
G06F 3/14 (2006.01)
(Continued)

(52) U.S. Cl.
CPC ............ *G06F 3/0346* (2013.01); *G06F 3/017* (2013.01); *G06F 3/0414* (2013.01);
(Continued)

(58) Field of Classification Search
CPC ...... G06F 3/0346; G06F 3/017; G06F 3/0414; G06F 3/0482; G06F 3/0485;
(Continued)

(56) References Cited

U.S. PATENT DOCUMENTS 8,543,166 B2 9/2013 Choi et al.
9,672,796 B2 6/2017 Son et al.
(Continued)

FOREIGN PATENT DOCUMENTS

EP 2613244 A2 7/2013
EP 2648066 A2 10/2013
(Continued)

OTHER PUBLICATIONS

Final Office Action in KR Application No. 10-2014-0166661, dated Jul. 28, 2016 in 4 pages.
(Continued)

*Primary Examiner* — Patrick N Edouard
*Assistant Examiner* — Eboni N Giles
(74) *Attorney, Agent, or Firm* — Knobbe Martens Olson & Bear LLP

(57) ABSTRACT

An electronic device according to an embodiment of the present invention may include a flexible display configured to display a first screen in a first state; a force direction sensing unit configured to sense a force direction of a contact applied to one point by an external object; and a control unit configured to sense an occurrence of a specific data reception event, when the flexible display is changed from the first state to a second state, display a second screen including first information of a first group including information regarding
(Continued)

the specific data reception event on the flexible display, and when a force direction of a first contact is acquired in the second state through the force direction sensing unit, display a third screen including second information of the first group including the information regarding the specific data reception event on the flexible display or simultaneously display the second screen and the third screen on the flexible display based on the force direction of the first contact.

7 Claims, 26 Drawing Sheets

(51) Int. Cl.
    *G06F 3/0487*     (2013.01)
    *G06F 3/01*     (2006.01)
    *G06F 3/0482*     (2013.01)
    *G06F 3/0485*     (2013.01)
    *G06F 3/041*     (2006.01)
    *G09G 5/00*     (2006.01)

(52) U.S. Cl.
    CPC .......... *G06F 3/0482* (2013.01); *G06F 3/0485* (2013.01); *G06F 3/0487* (2013.01); *G06F 3/14* (2013.01); *G09G 5/006* (2013.01); *G06F 2203/04803* (2013.01); *G09G 2380/02* (2013.01)

(58) Field of Classification Search
    CPC .................... G06F 3/0487; G06F 3/14; G06F 2203/04803; G09G 5/006; G09G 2380/02
    See application file for complete search history.

(56) References Cited

U.S. PATENT DOCUMENTS

| | | |
|---|---|---|
| 2008/0303782 A1 | 12/2008 | Grant et al. |
| 2012/0105358 A1* | 5/2012 | Momeyer ............ G06F 3/0414 345/174 |
| 2012/0133621 A1 | 5/2012 | Kim |
| 2012/0289290 A1 | 11/2012 | Chae et al. |
| 2012/0320081 A1 | 12/2012 | Kim et al. |
| 2013/0120302 A1 | 5/2013 | Kang et al. |
| 2013/0169520 A1 | 7/2013 | Cho |
| 2013/0215088 A1 | 8/2013 | Son |
| 2013/0265257 A1 | 10/2013 | Jung et al. |
| 2013/0285922 A1 | 10/2013 | Alberth, Jr. |
| 2013/0285933 A1 | 10/2013 | Sim et al. |
| 2013/0296000 A1* | 11/2013 | Park ....................... G09G 3/001 455/566 |
| 2013/0321264 A1 | 12/2013 | Park et al. |
| 2014/0002355 A1 | 1/2014 | Lee et al. |
| 2014/0028596 A1* | 1/2014 | Seo ....................... G06F 3/0487 345/173 |
| 2014/0054438 A1 | 2/2014 | Yun et al. |
| 2014/0098028 A1* | 4/2014 | Kwak ..................... G09G 5/00 345/173 |
| 2014/0101560 A1* | 4/2014 | Kwak ................... G06F 1/1652 715/738 |
| 2014/0320425 A1 | 10/2014 | Jeong et al. |
| 2014/0347287 A1* | 11/2014 | Lee ...................... G06F 1/1652 345/173 |
| 2014/0375596 A1 | 12/2014 | Kim et al. |
| 2016/0266788 A1* | 9/2016 | Park ....................... G06F 9/445 |
| 2016/0291762 A1 | 10/2016 | Kim et al. |
| 2016/0299579 A1 | 10/2016 | Kim et al. |
| 2017/0262070 A1* | 9/2017 | Kwak ................... G06F 3/0487 |

FOREIGN PATENT DOCUMENTS

| | | |
|---|---|---|
| KR | 10-2010-0015231 A | 2/2010 |
| KR | 10-2010-0018883 A | 2/2010 |
| KR | 10-2010-0023326 A | 3/2010 |
| KR | 10-2010-0041733 A | 4/2010 |
| KR | 10-2010-0107377 A | 10/2010 |
| KR | 10-2011-0063410 A | 6/2011 |
| KR | 10-2012-0056512 A | 6/2012 |
| KR | 10-2010-0138618 A | 12/2012 |
| KR | 10-2012-0138618 A | 12/2012 |
| KR | 10-2013-0030727 A | 3/2013 |
| KR | 10-2013-0085528 A | 7/2013 |
| KR | 10-2013-0113901 A | 10/2013 |
| KR | 10-2013-0120817 A | 11/2013 |
| KR | 10-2013-0132679 A | 12/2013 |
| KR | 10-2013-0135648 A1 | 12/2013 |

OTHER PUBLICATIONS

International Search Report dated Sep. 30, 2014 for International Application No. PCT/KR2013/011918, filed Dec. 20, 2013.
International Search Report dated Sep. 22, 2014 for International Application No. PCT/KR2013/011916, filed Dec. 20, 2013.
Office Action in KR Application No. 10-2013-0159356, dated Mar. 31, 2015 in 4 pages.
Office Action in KR Application No. 10-2013-0159359, dated Apr. 30, 2015 in 4 pages.
Office Action received in U.S. Appl. No. 15/038,406, dated Jul. 13, 2017.
Office Action received in U.S. Appl. No. 15/038,432, dated May 11, 2017.
Office Action received in U.S. Appl. No. 15/038,406, dated Mar. 14, 2018.
Notice of Allowance in KR Application No. 10-2013-0159356, dated Sep. 26, 2015 in 2 pages.
International Search Report dated Sep. 22, 2014 for International Application No. PCT/KR2013/011917, filed Dec. 20, 2013.
Final Office Action received in U.S. Appl. No. 15/038,406, dated Apr. 18, 2019.
Final Office Action received in U.S. Appl. No. 15/038,406, dated Oct. 9, 2018.
Final Office Action received in U.S. Appl. No. 15/038,432, dated Jul. 17, 2018.
Notice of Allowance in KR Application No. 10-2014-0166659, dated Feb. 22, 2019 in 2 pages.
Office Action in KR Application No. 10-2014-0166659, dated Jun. 29, 2018 in 4 pages.
Office Action received in U.S. Appl. No. 15/038,432, dated Jan. 10, 2019.

* cited by examiner

[Fig. 1]
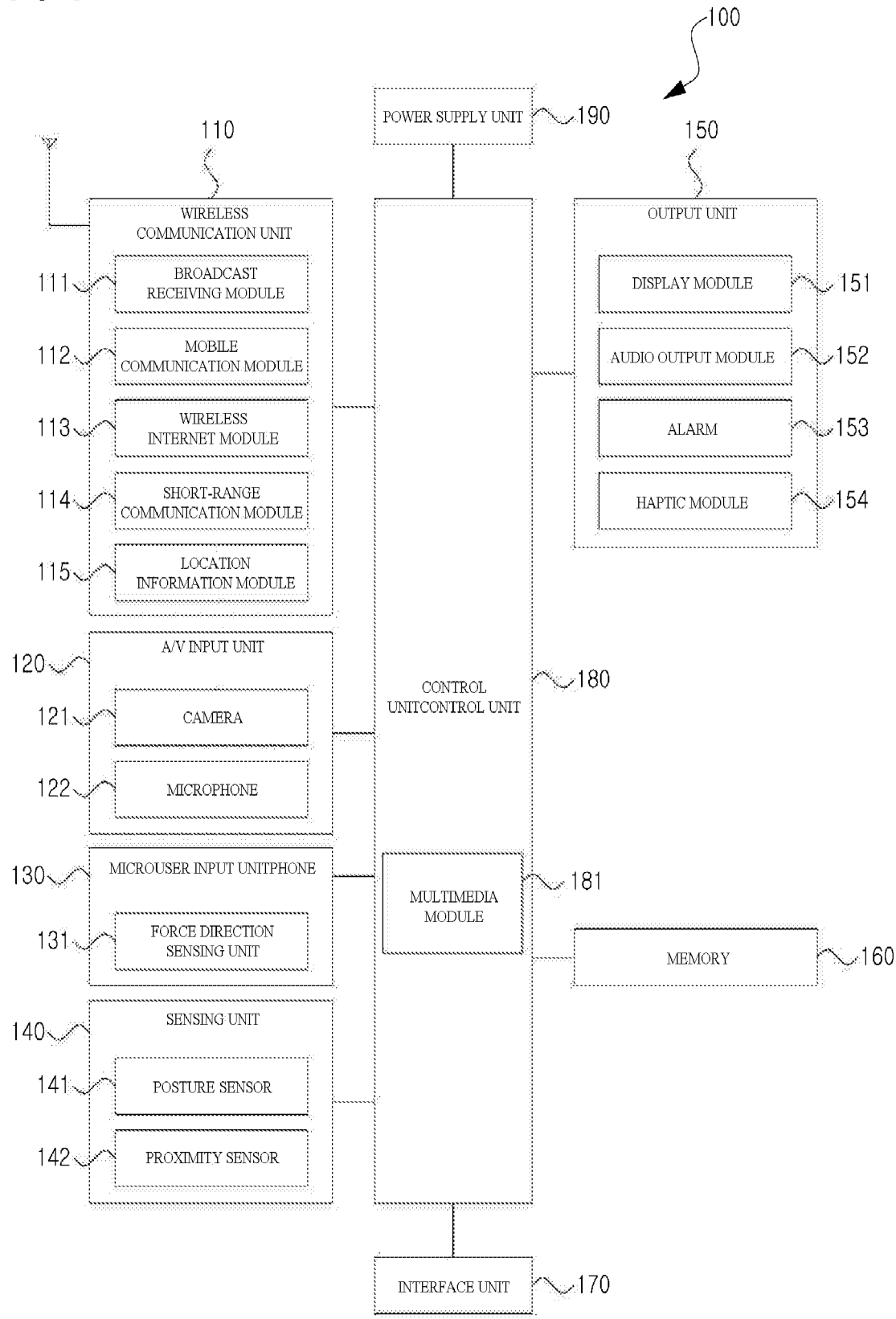

[Fig. 2]
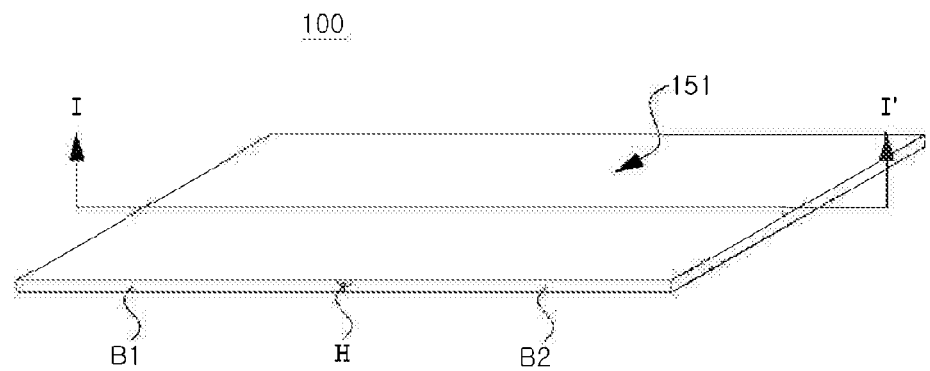
(a)
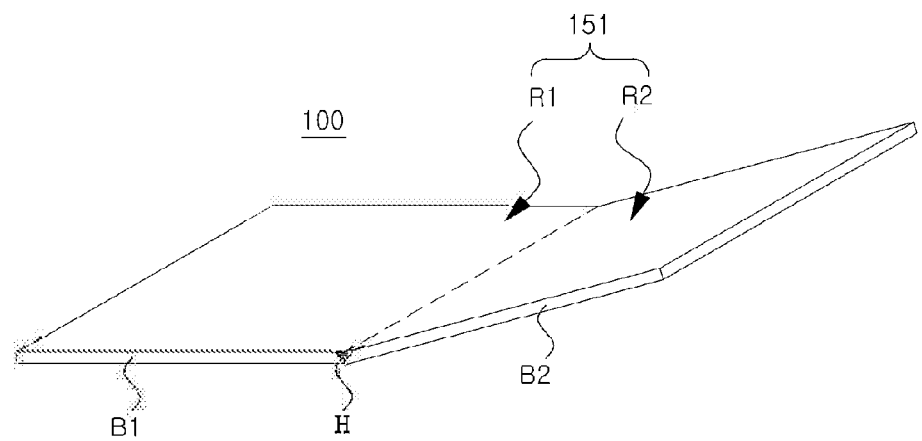
(b)
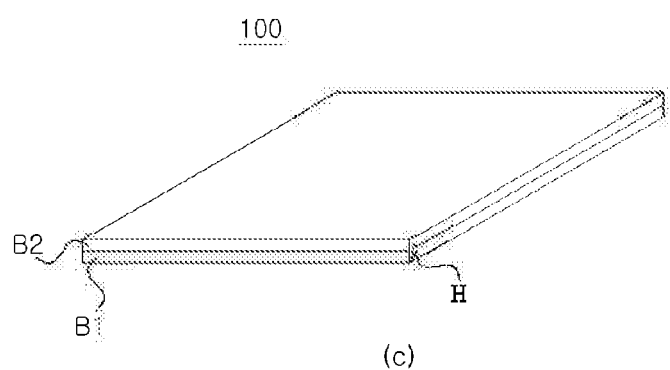
(c)

[Fig. 3]
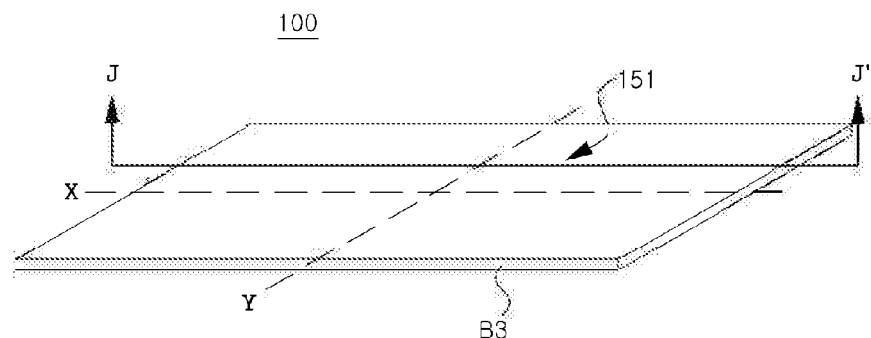
(a)
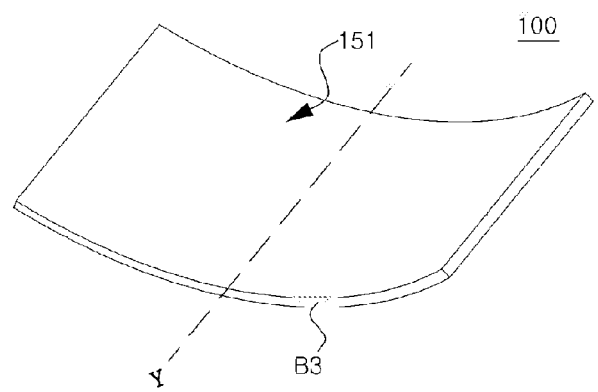
(b)
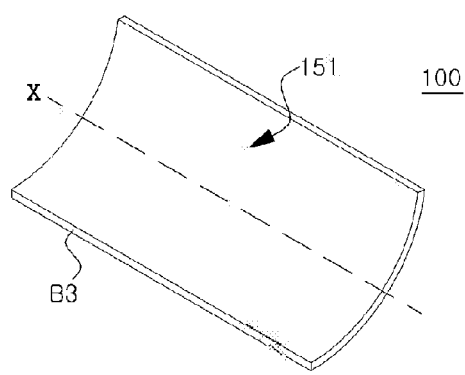
(b)

[Fig. 4]
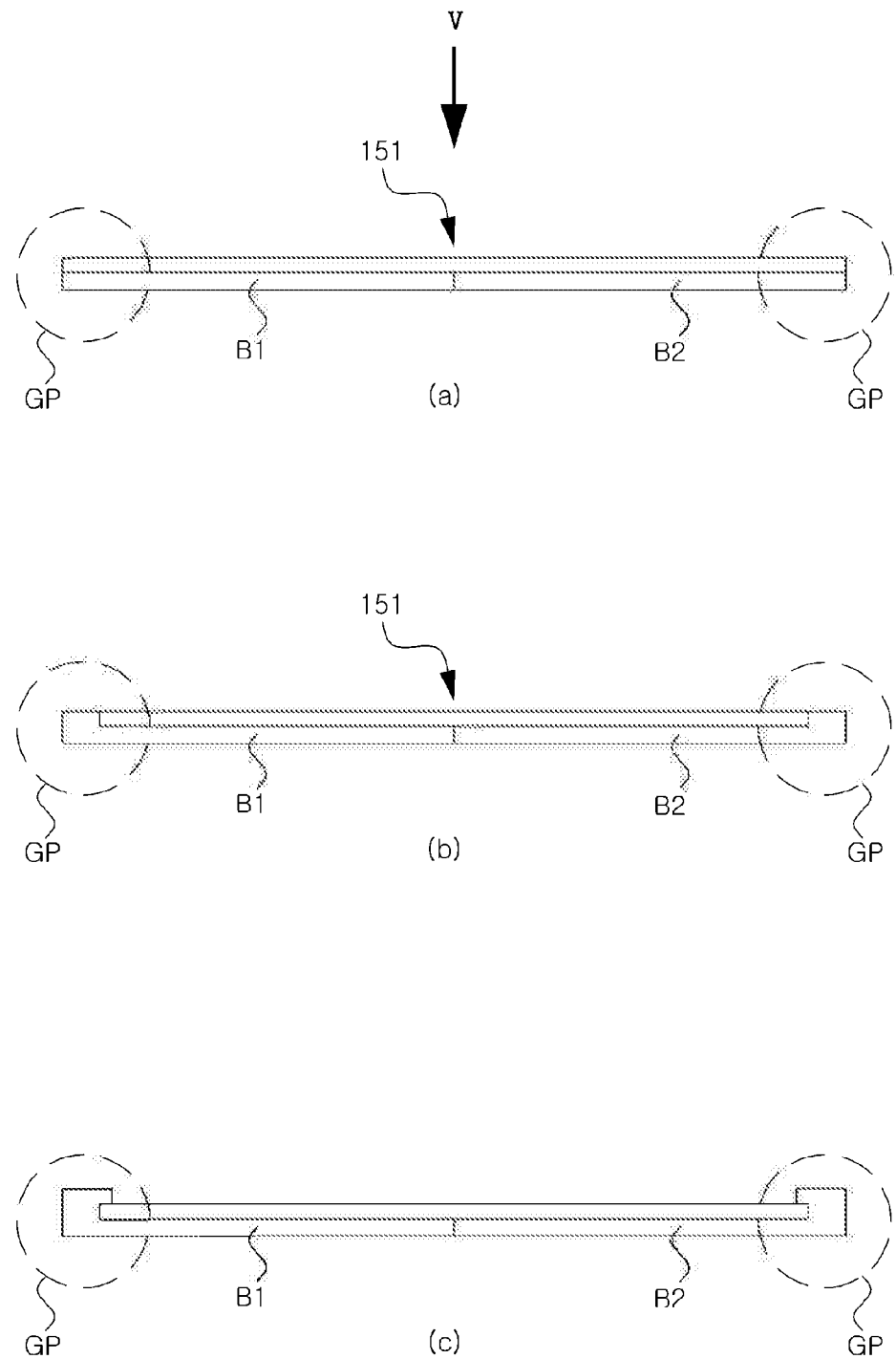

[Fig. 5]
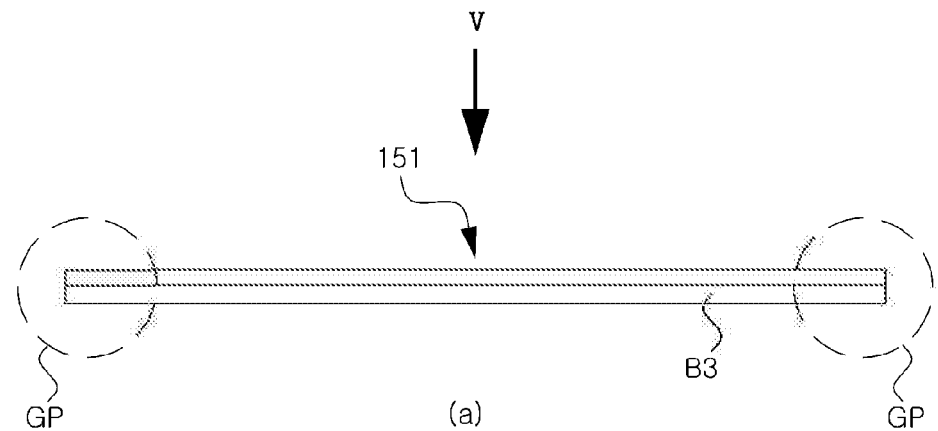
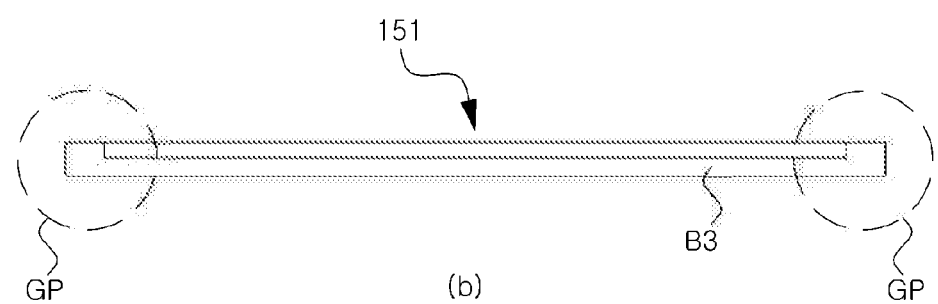
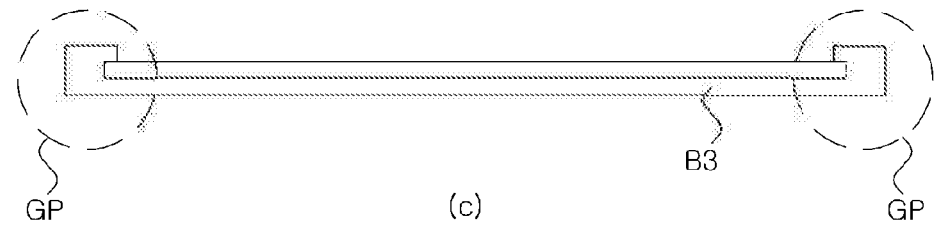

[Fig. 6]
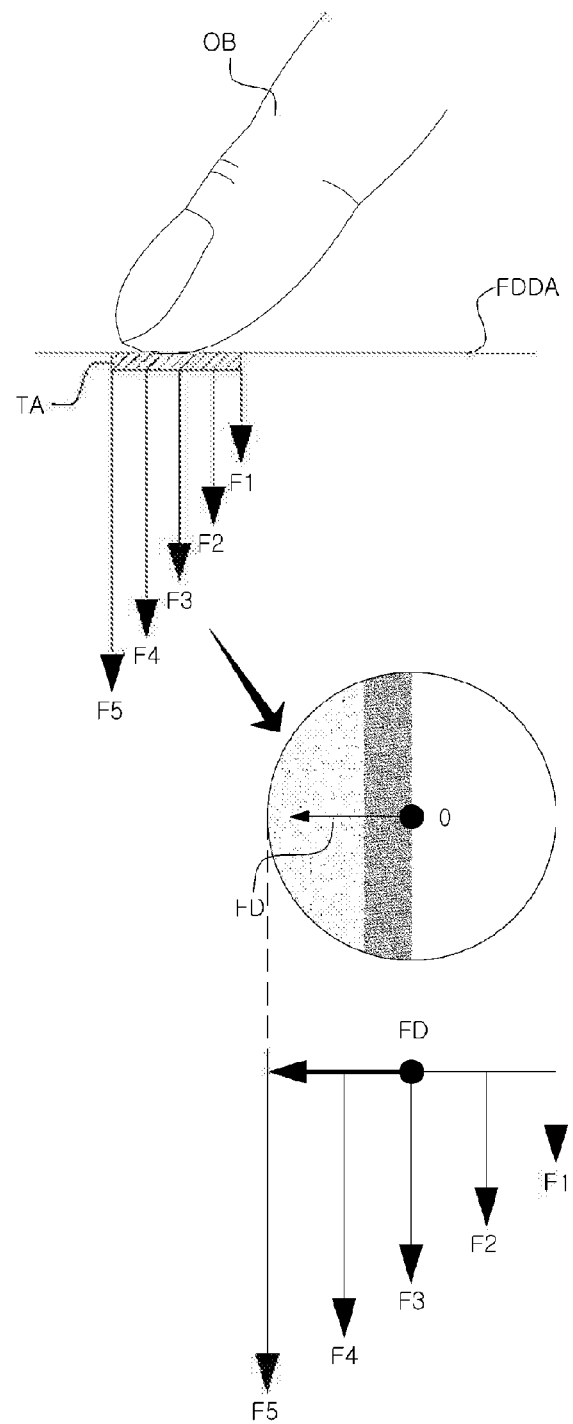

[Fig. 7]
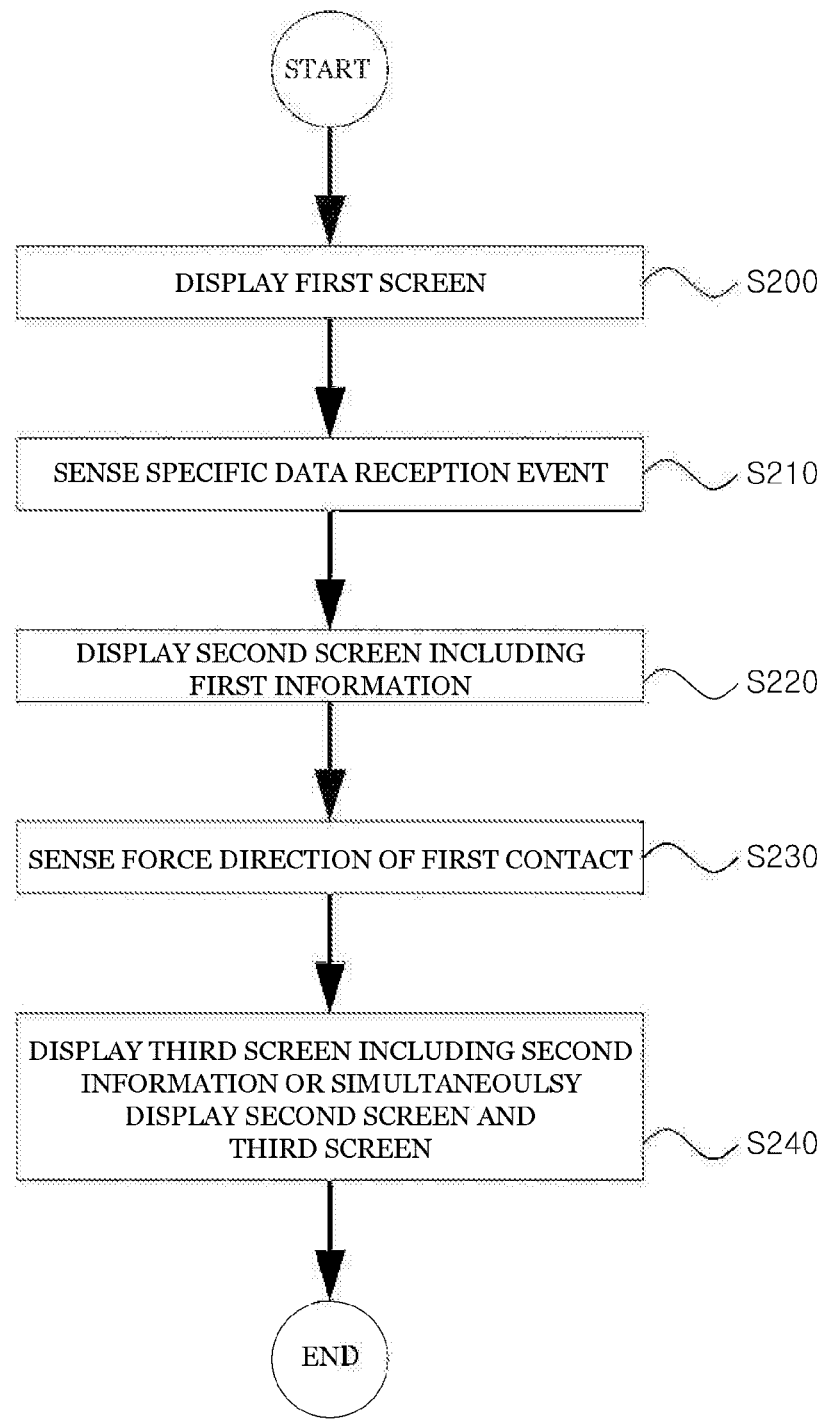

[Fig. 8]
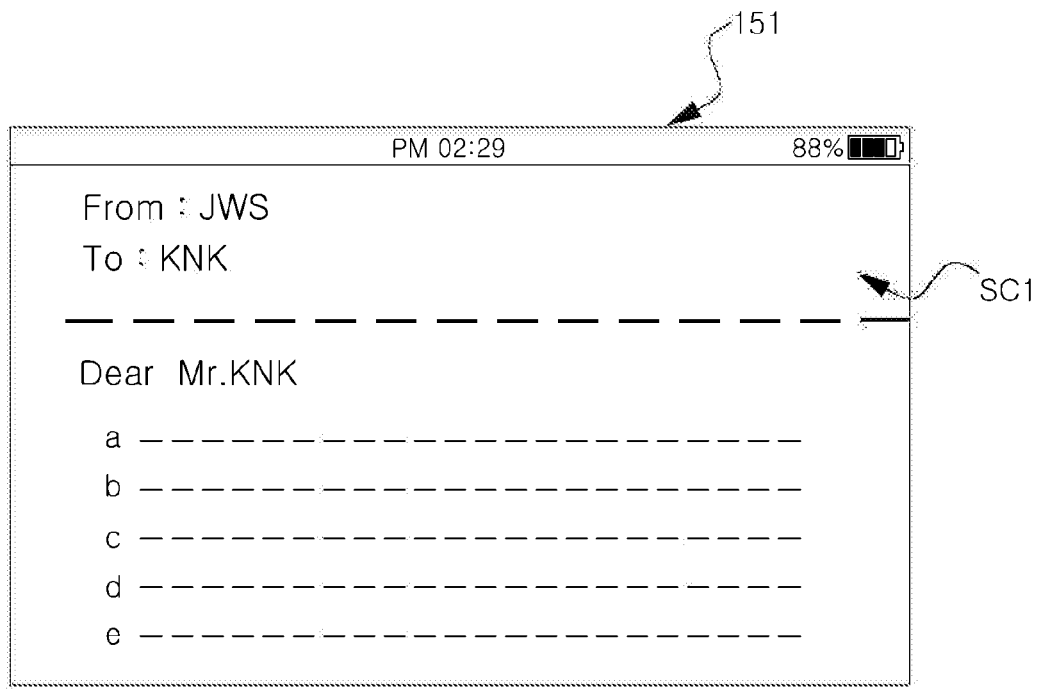
[Fig. 9]
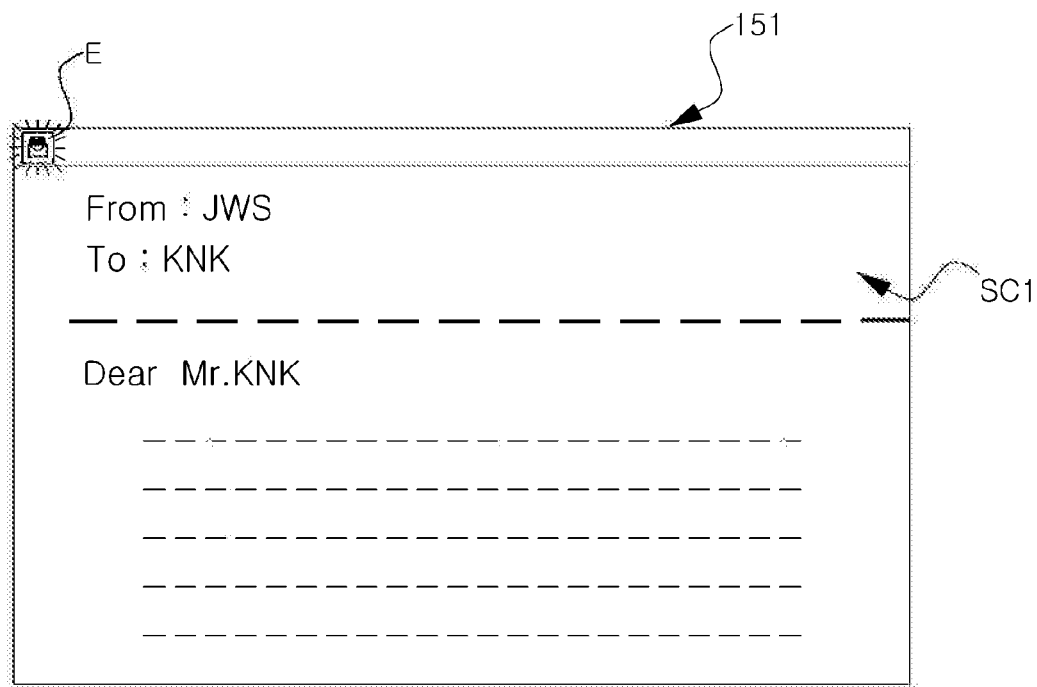

[Fig. 10]
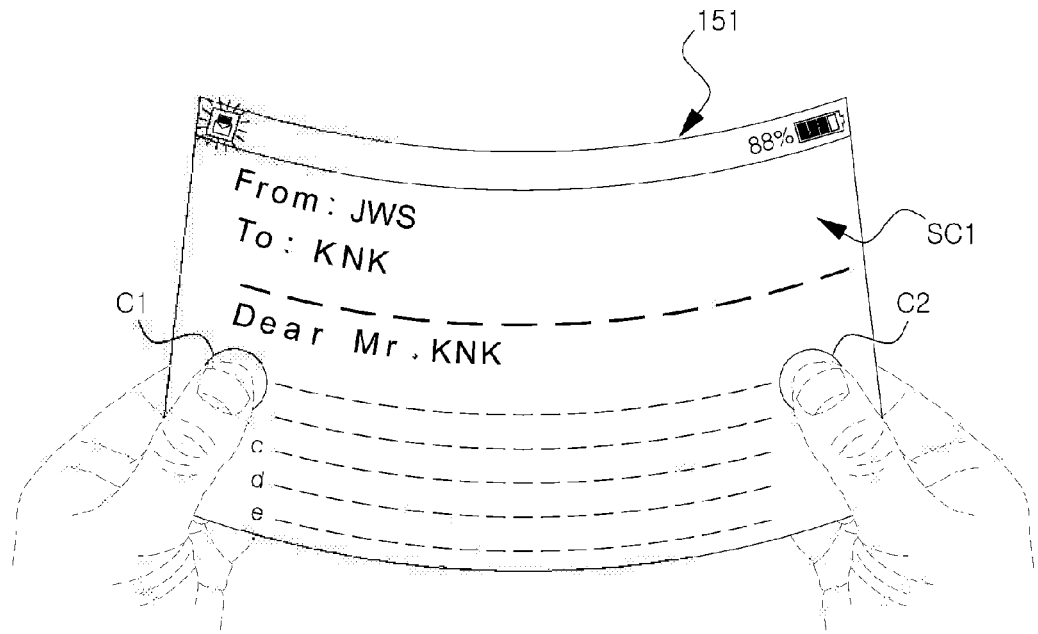
[Fig. 11]
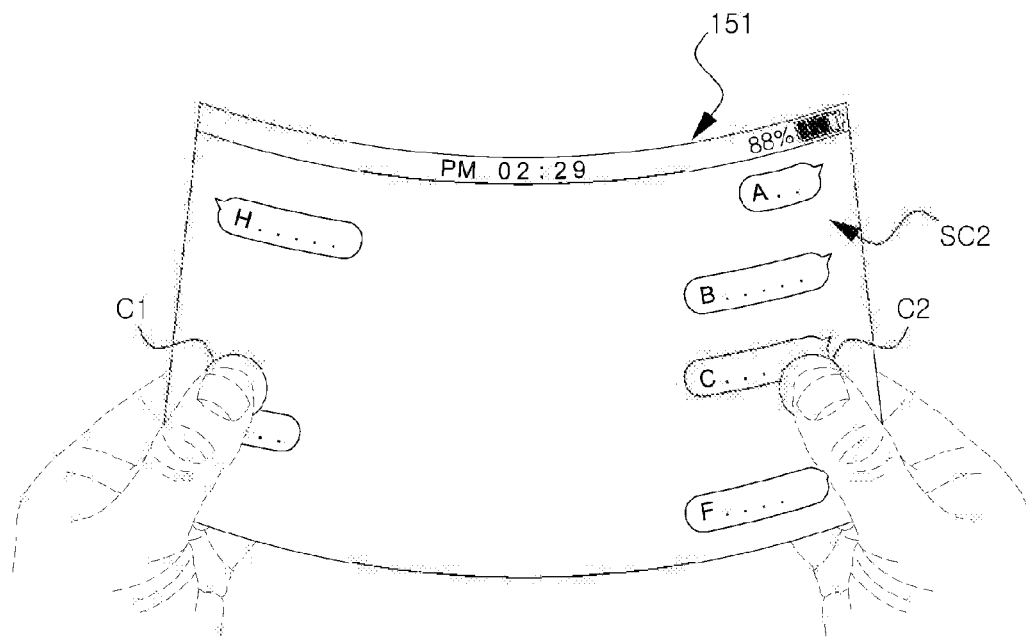

[Fig. 12]
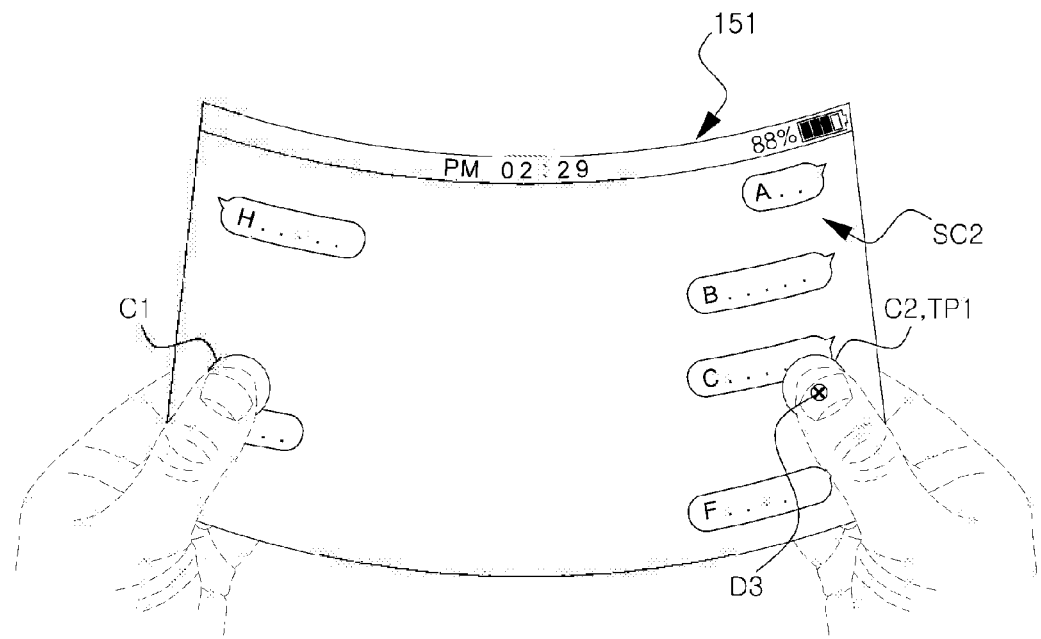
[Fig. 13]
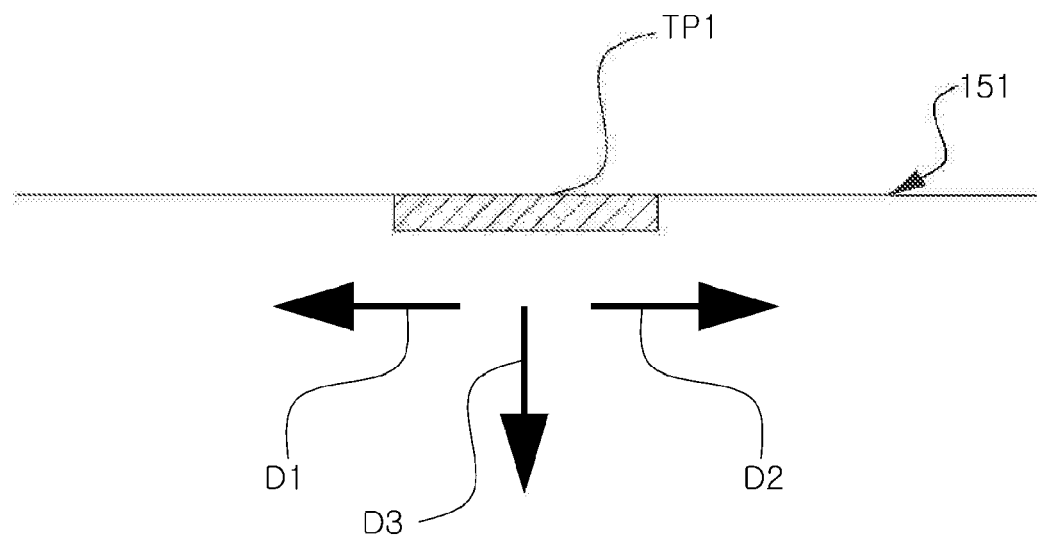

[Fig. 14]
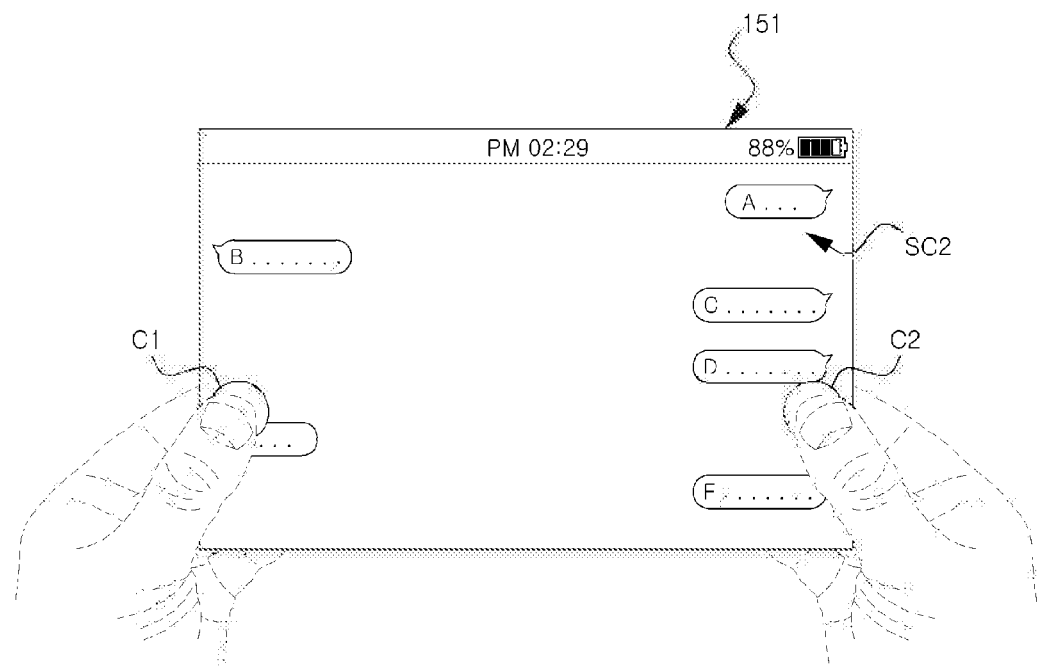
[Fig. 15]
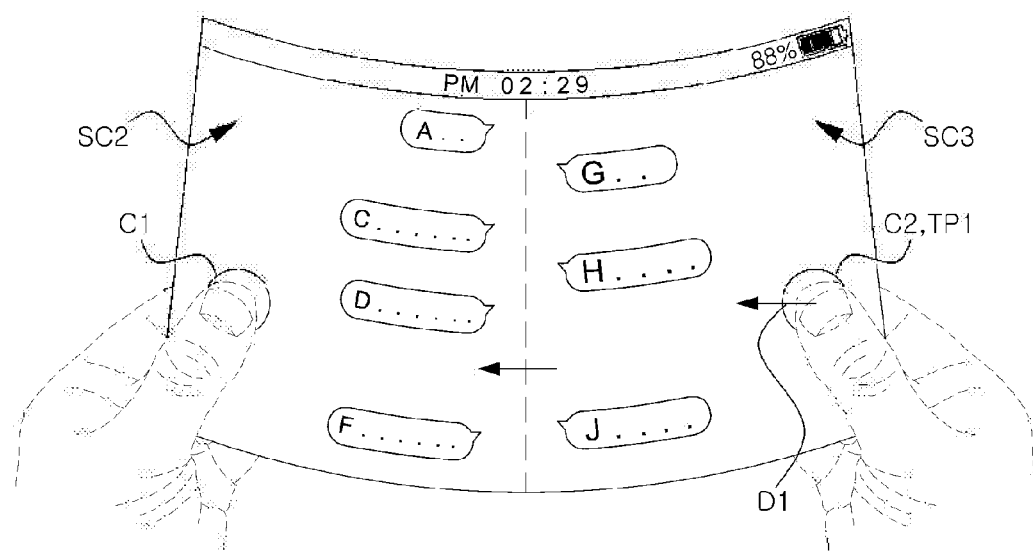

[Fig. 16]
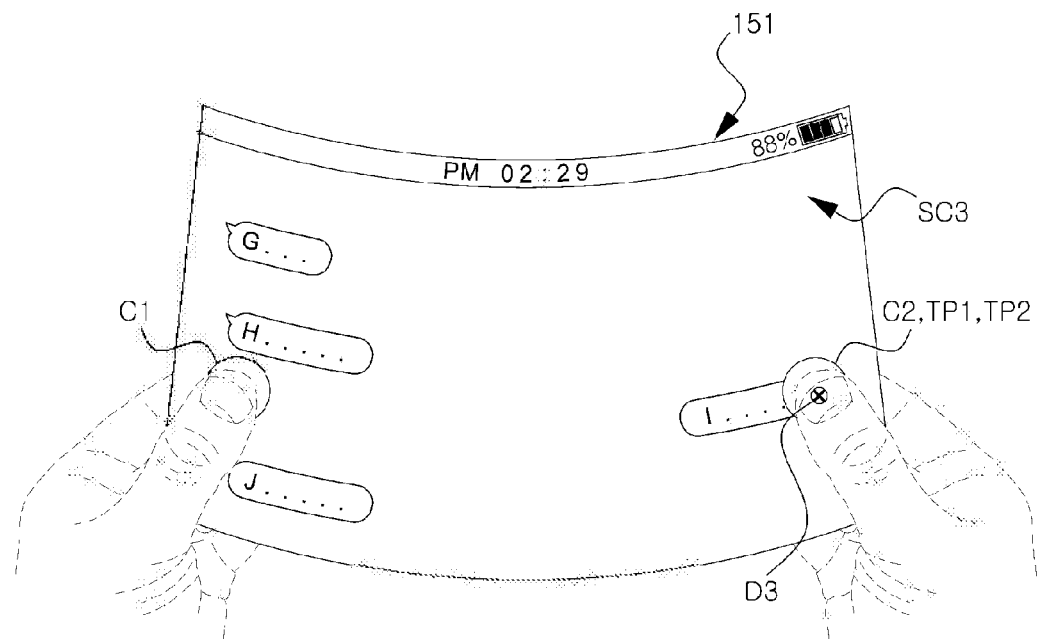
[Fig. 17]
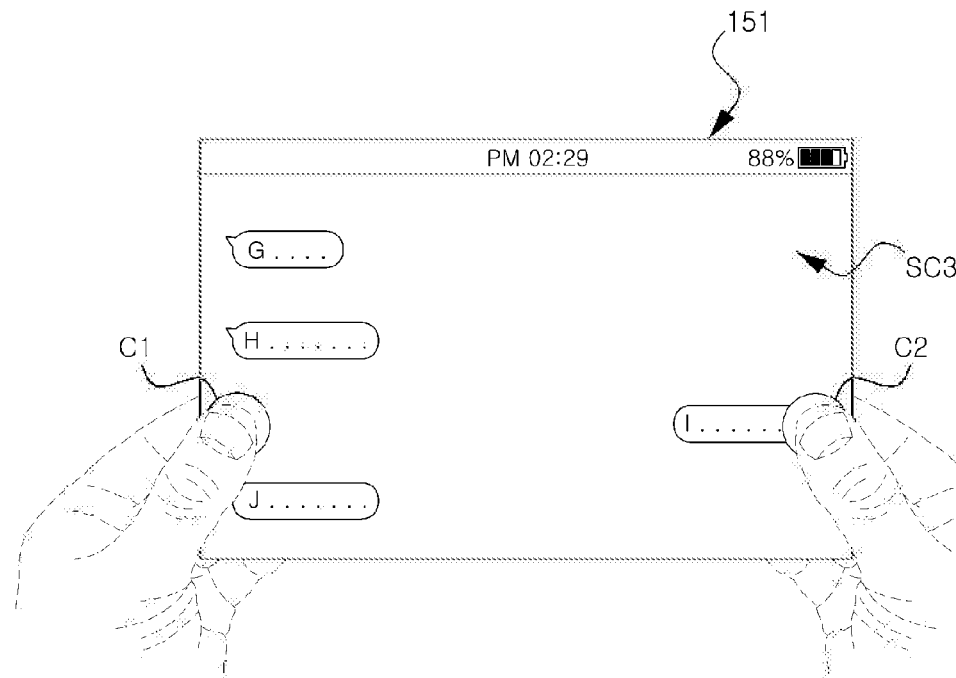

[Fig. 18]
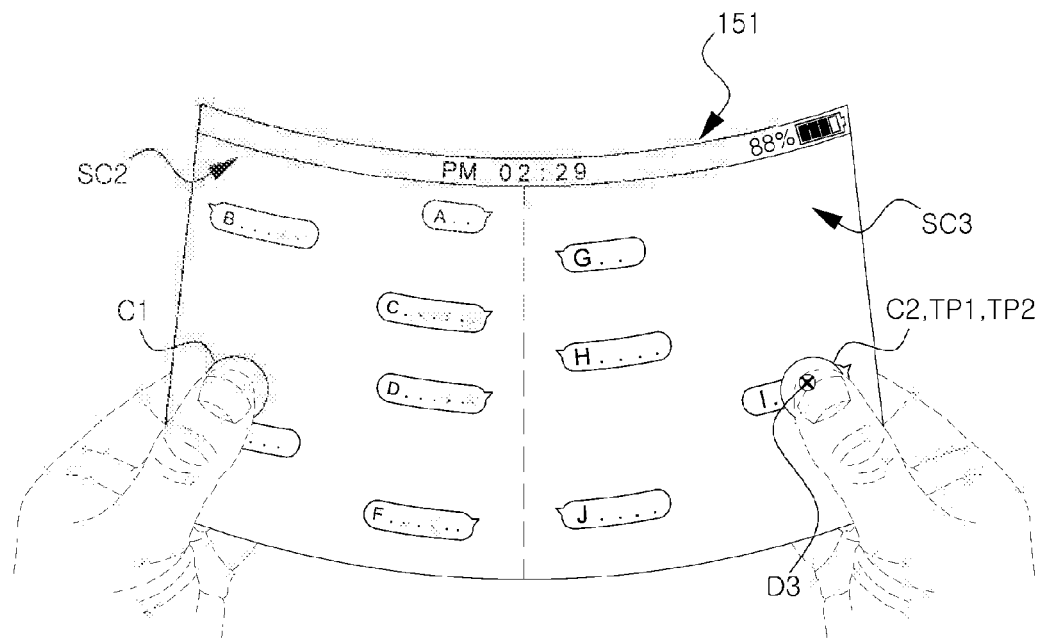
[Fig. 19]
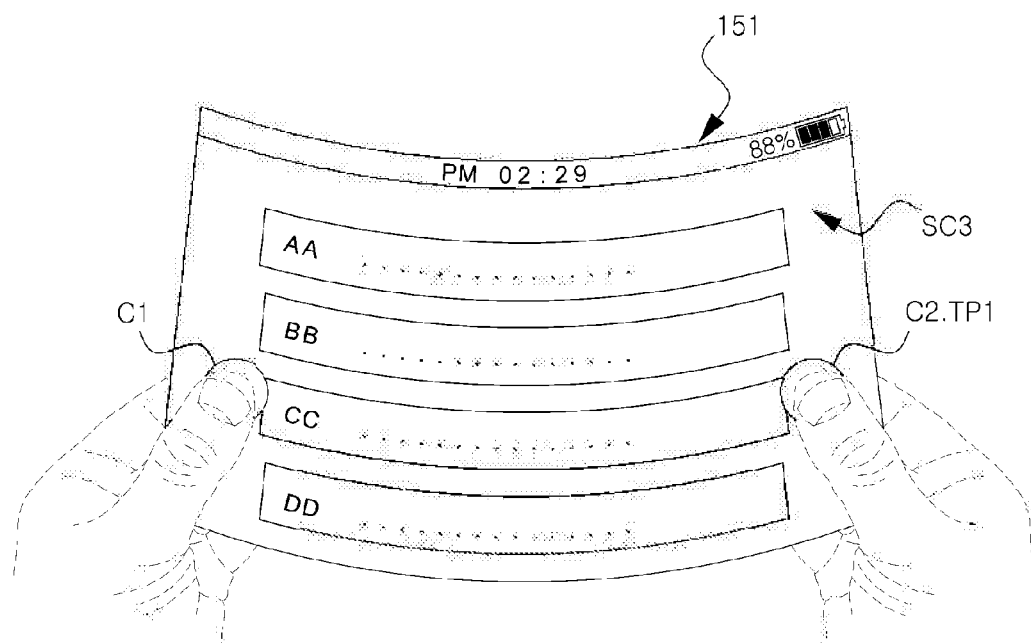

[Fig. 20]
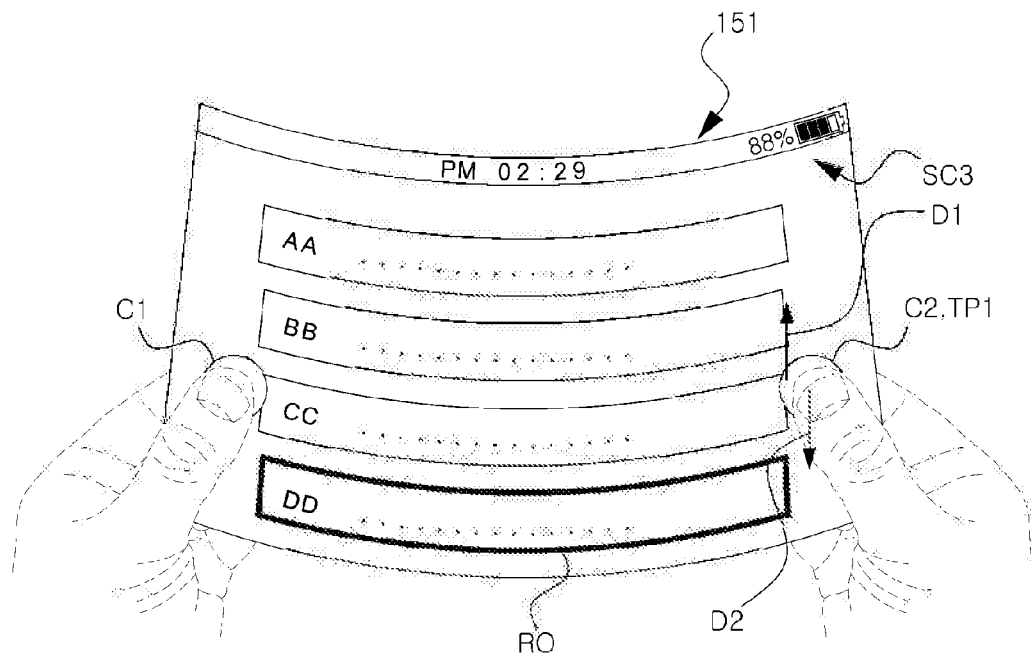
[Fig. 21]
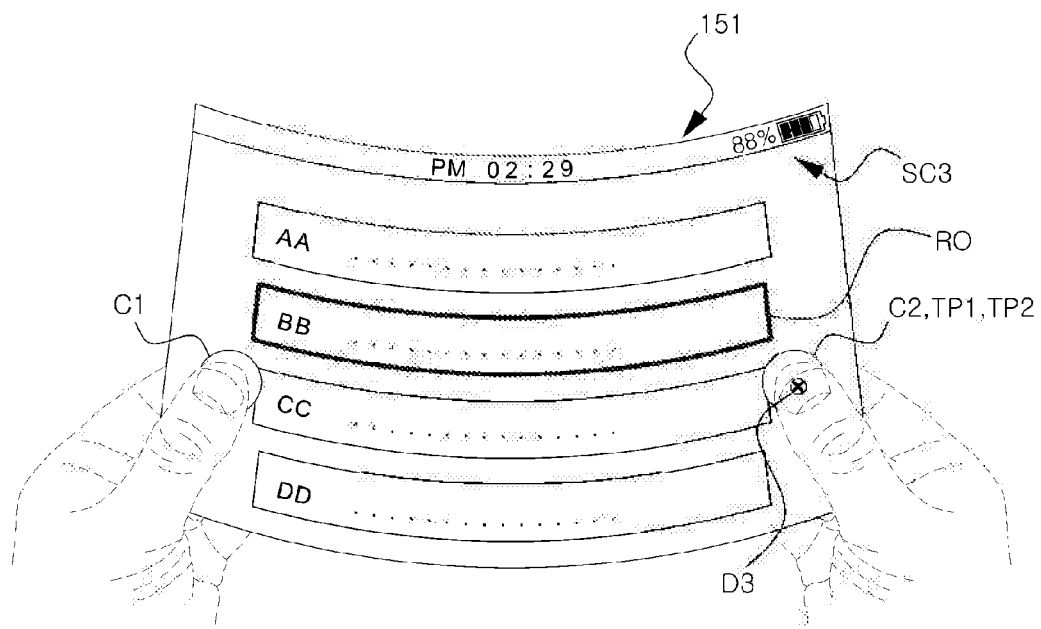

[Fig. 22]
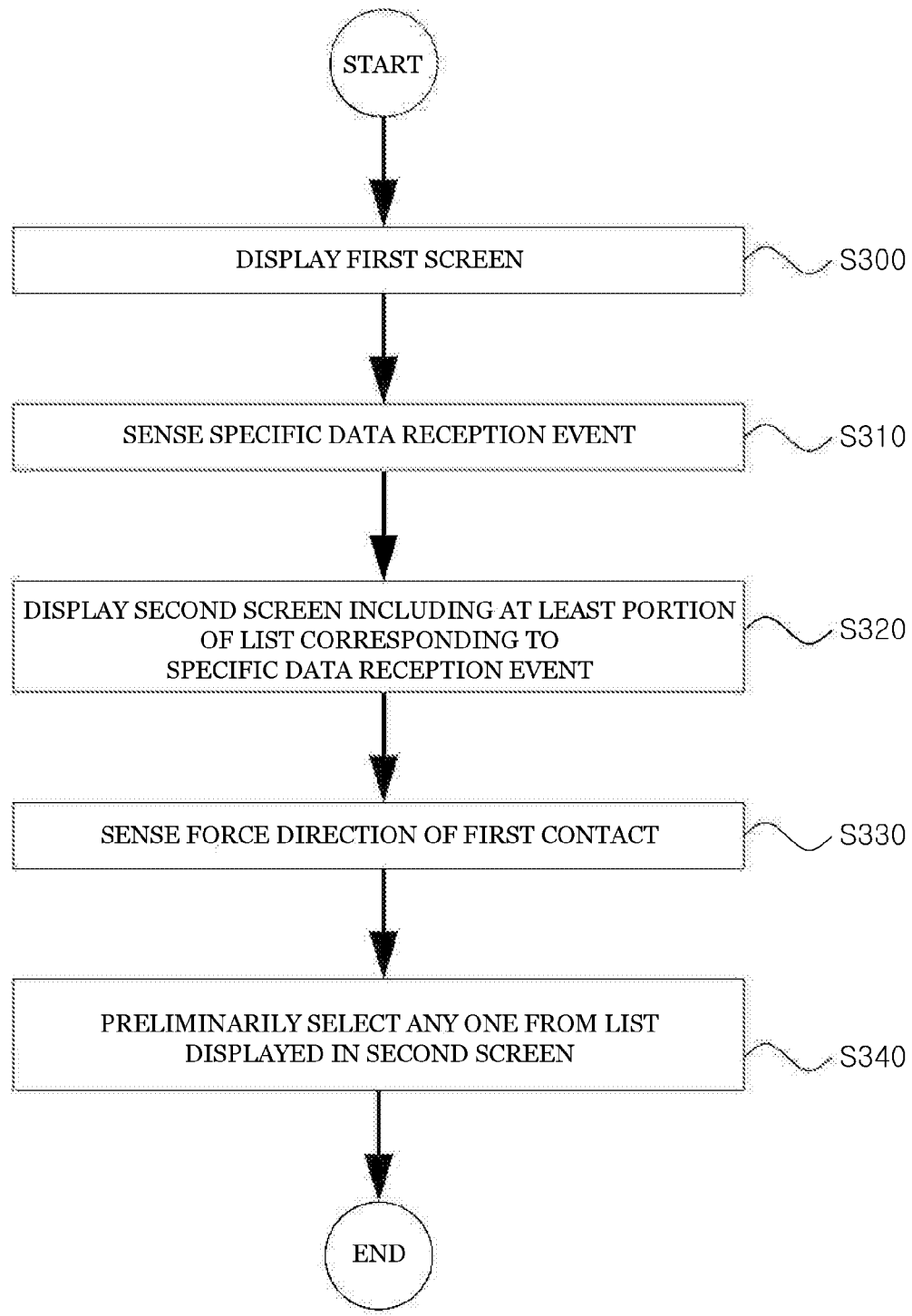

[Fig. 23]
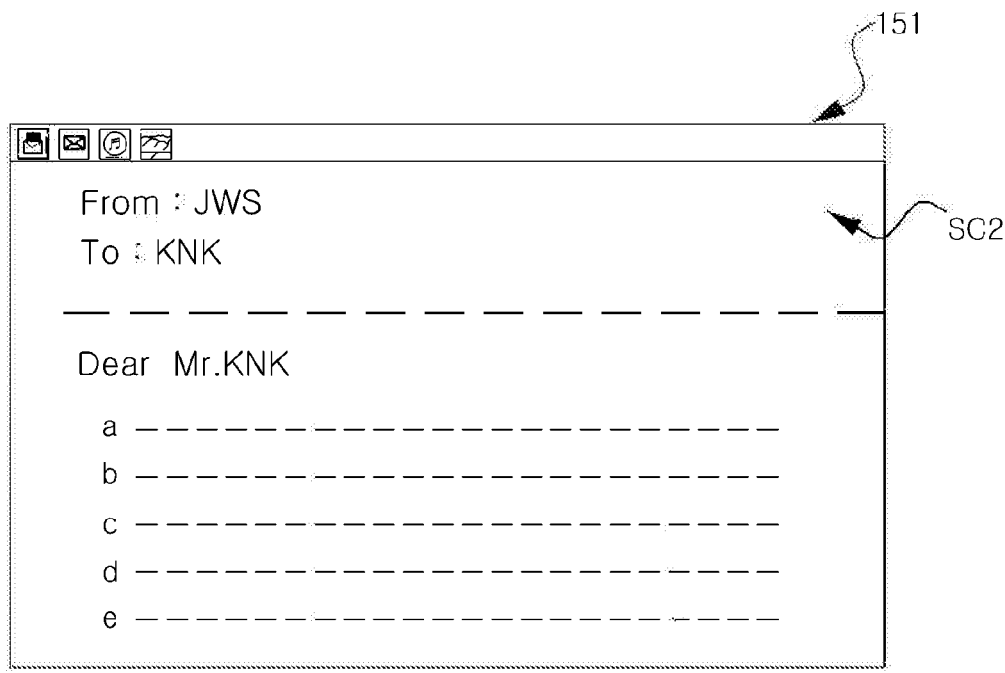
[Fig. 24]
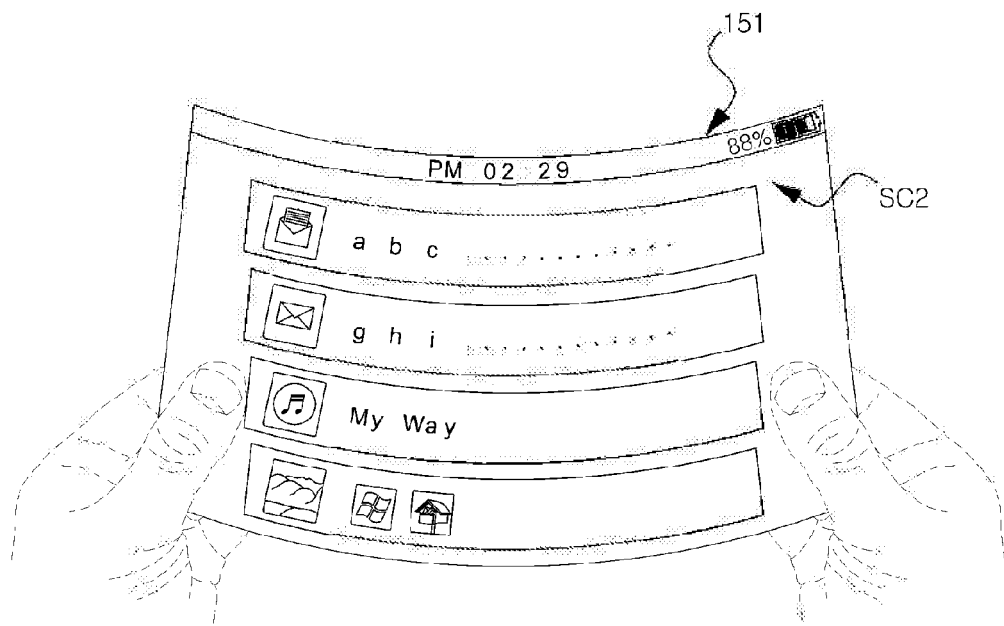

[Fig. 25]
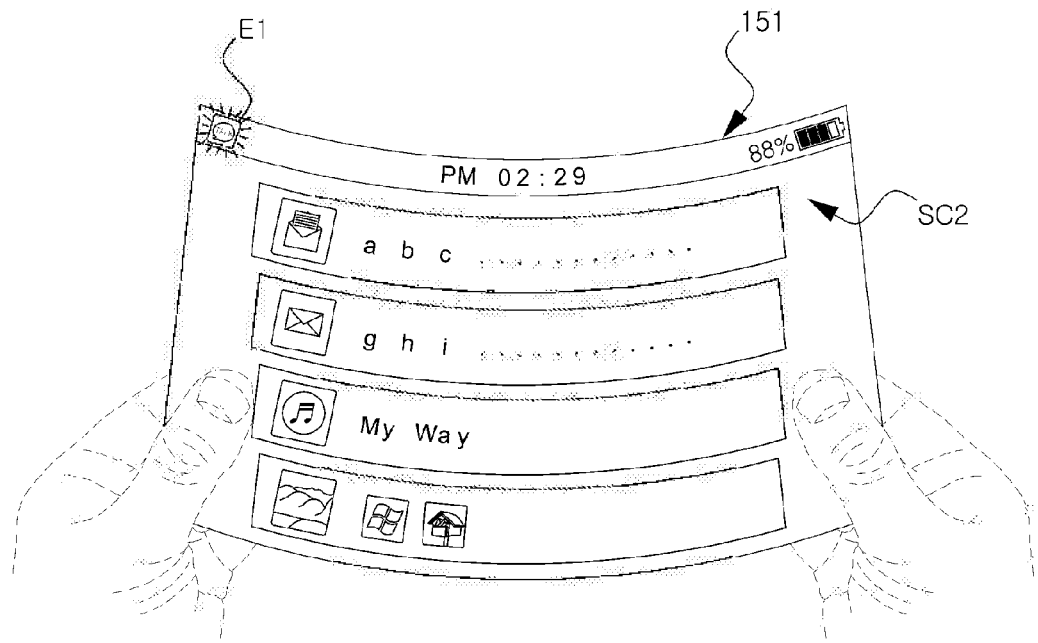
[Fig. 26]
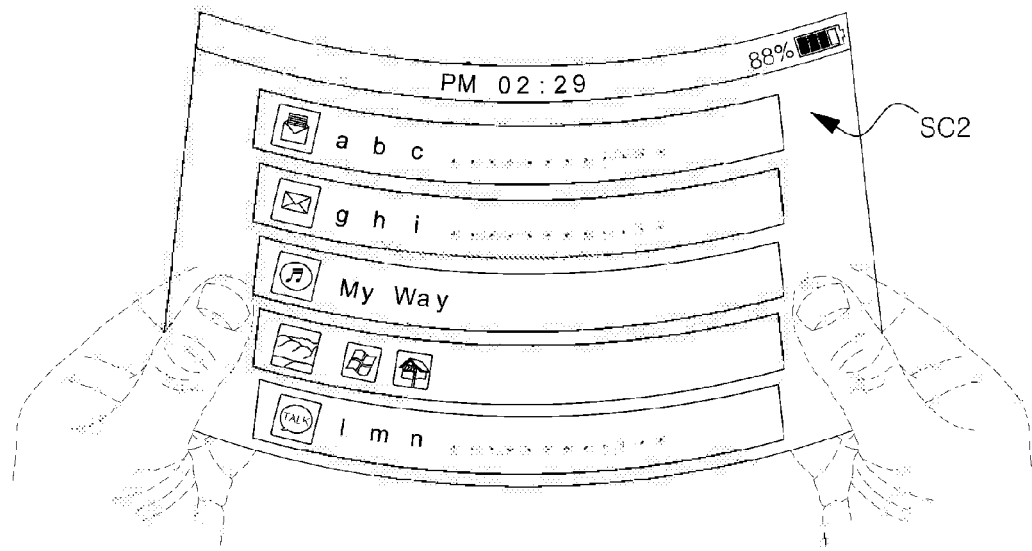

[Fig. 27]
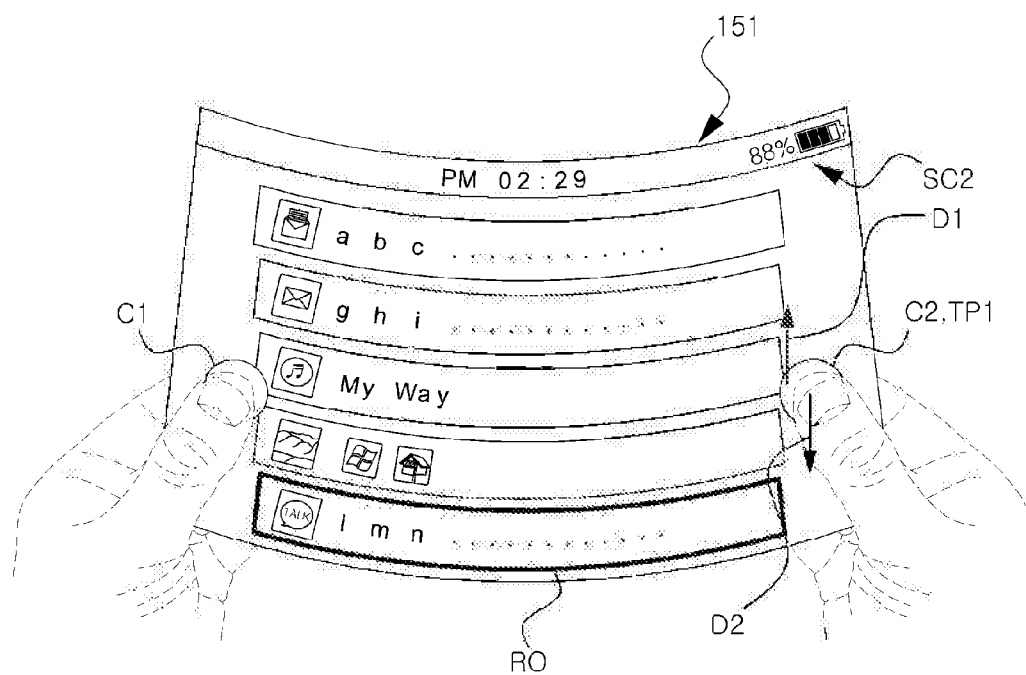

[Fig. 28]
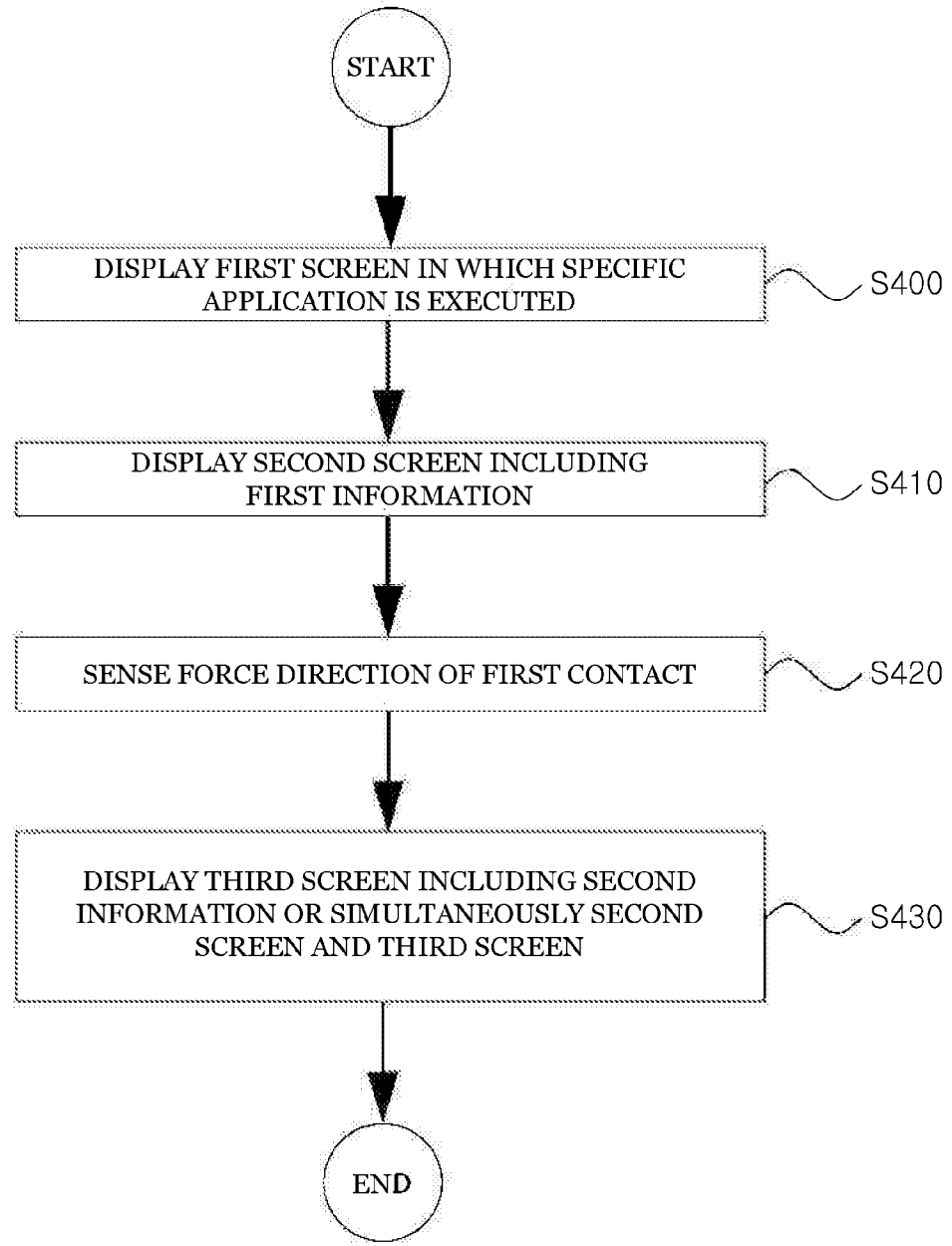

[Fig. 29]
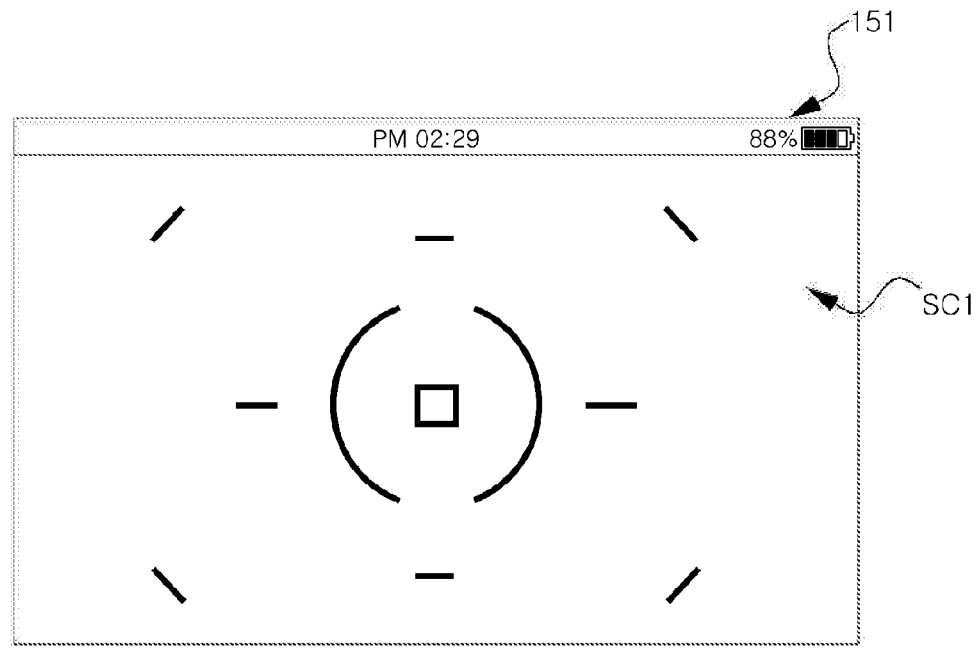
[Fig. 30]
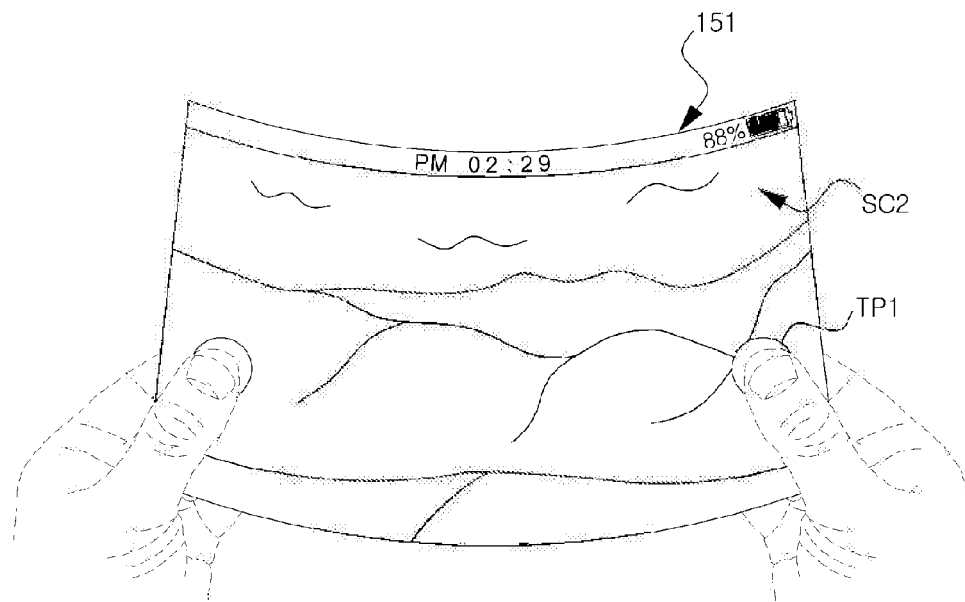

[Fig. 31]
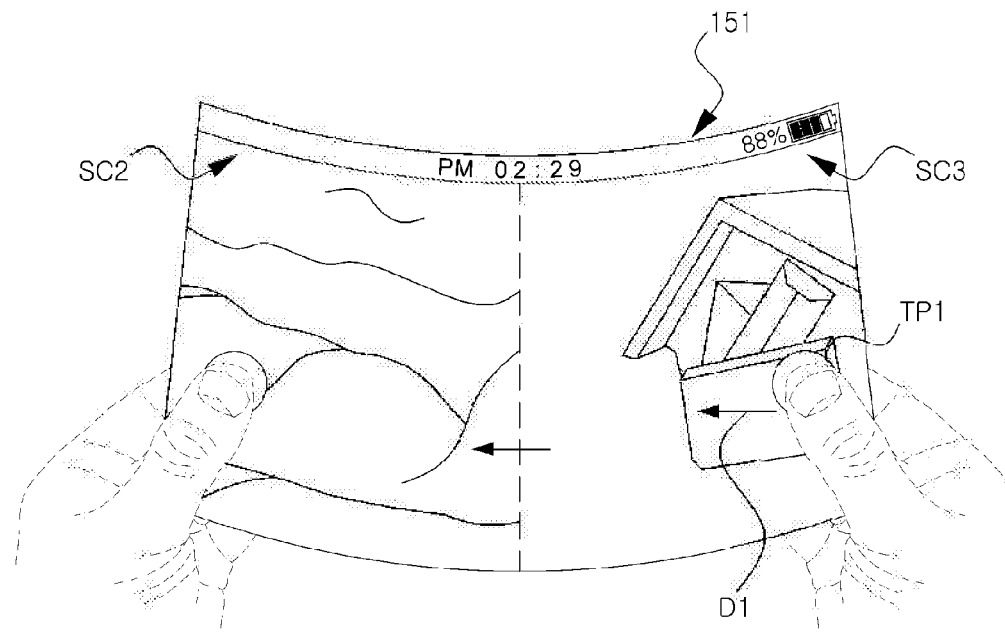
[Fig. 32]
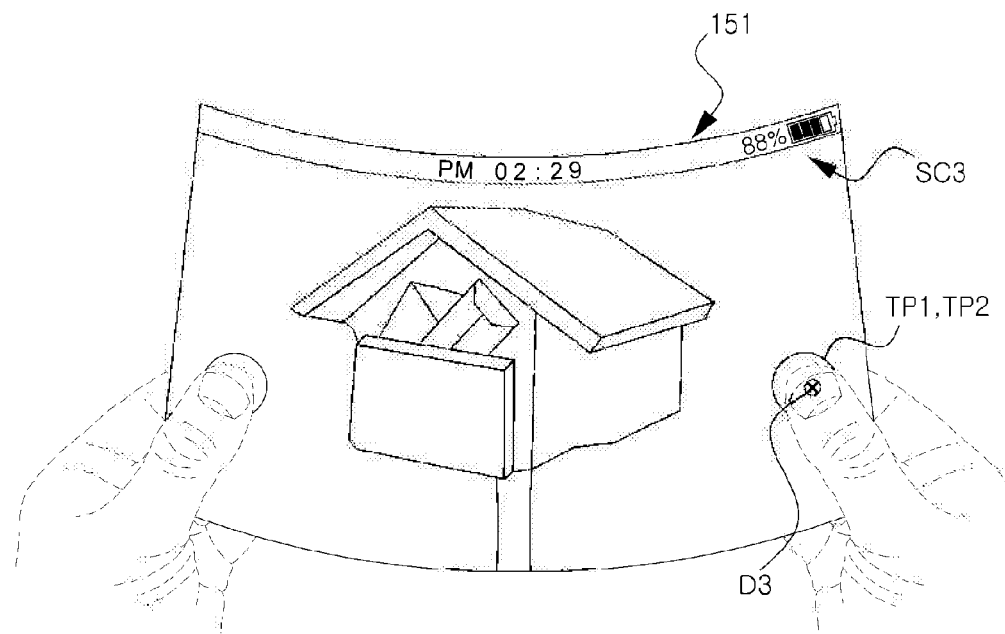

[Fig. 33]
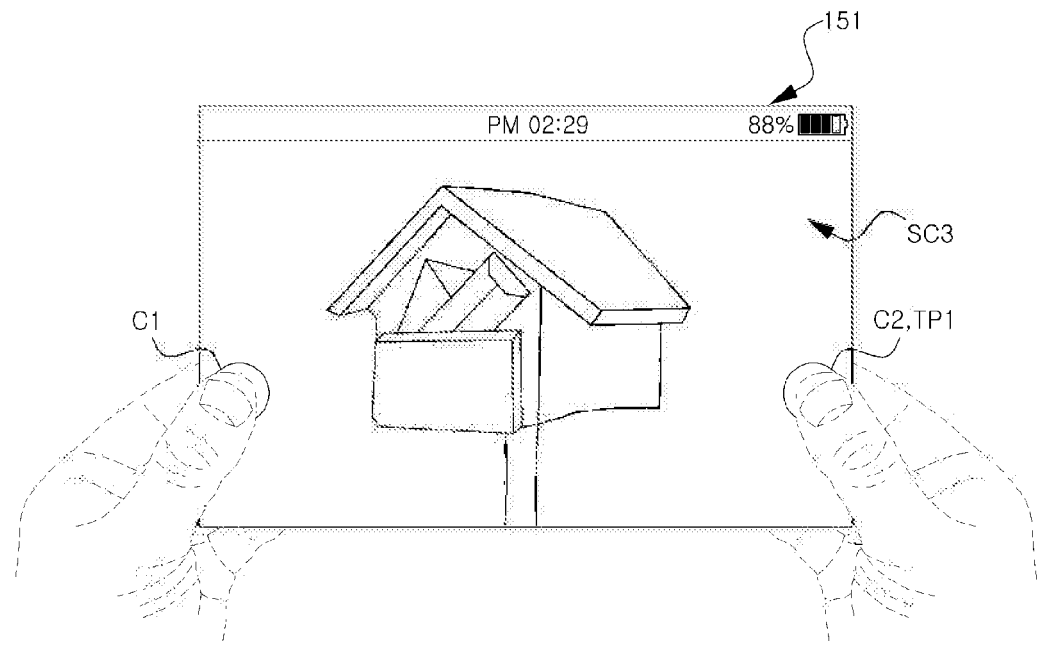
[Fig. 34]
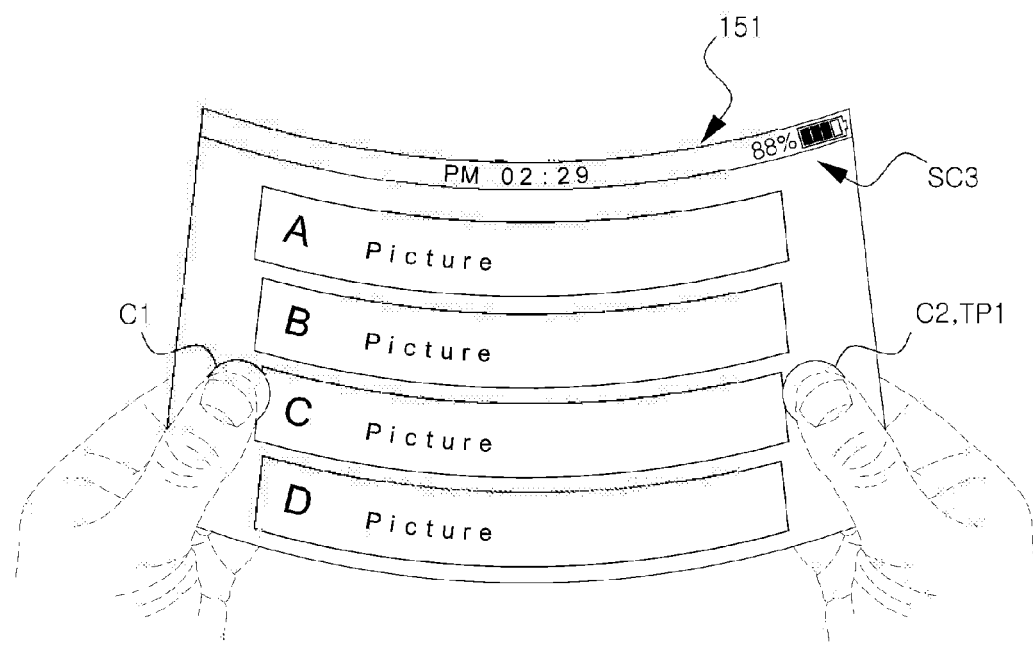

[Fig. 35]
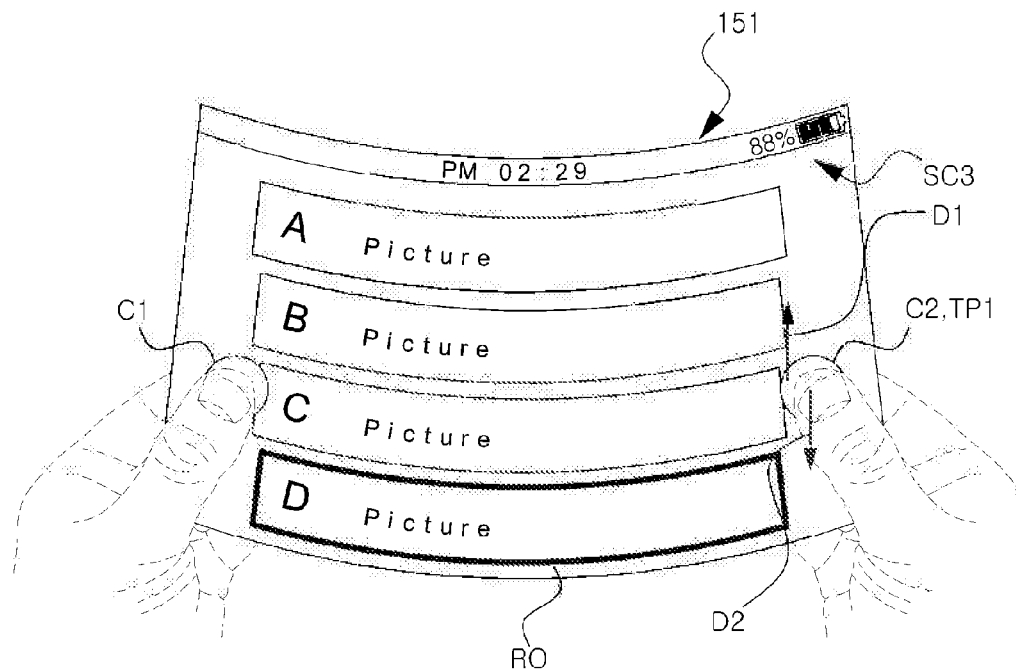
[Fig. 36]
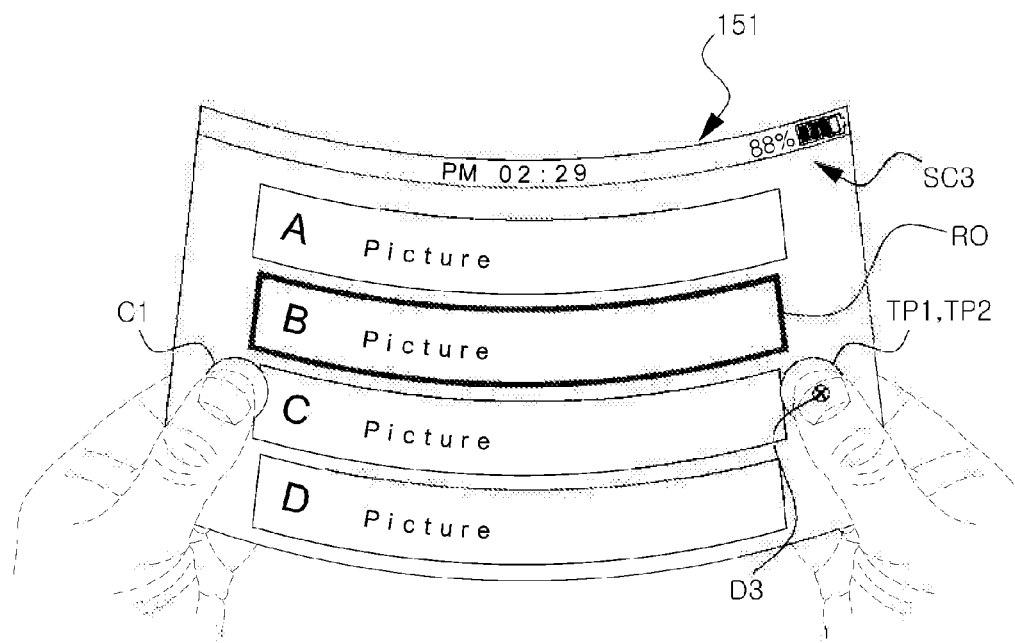

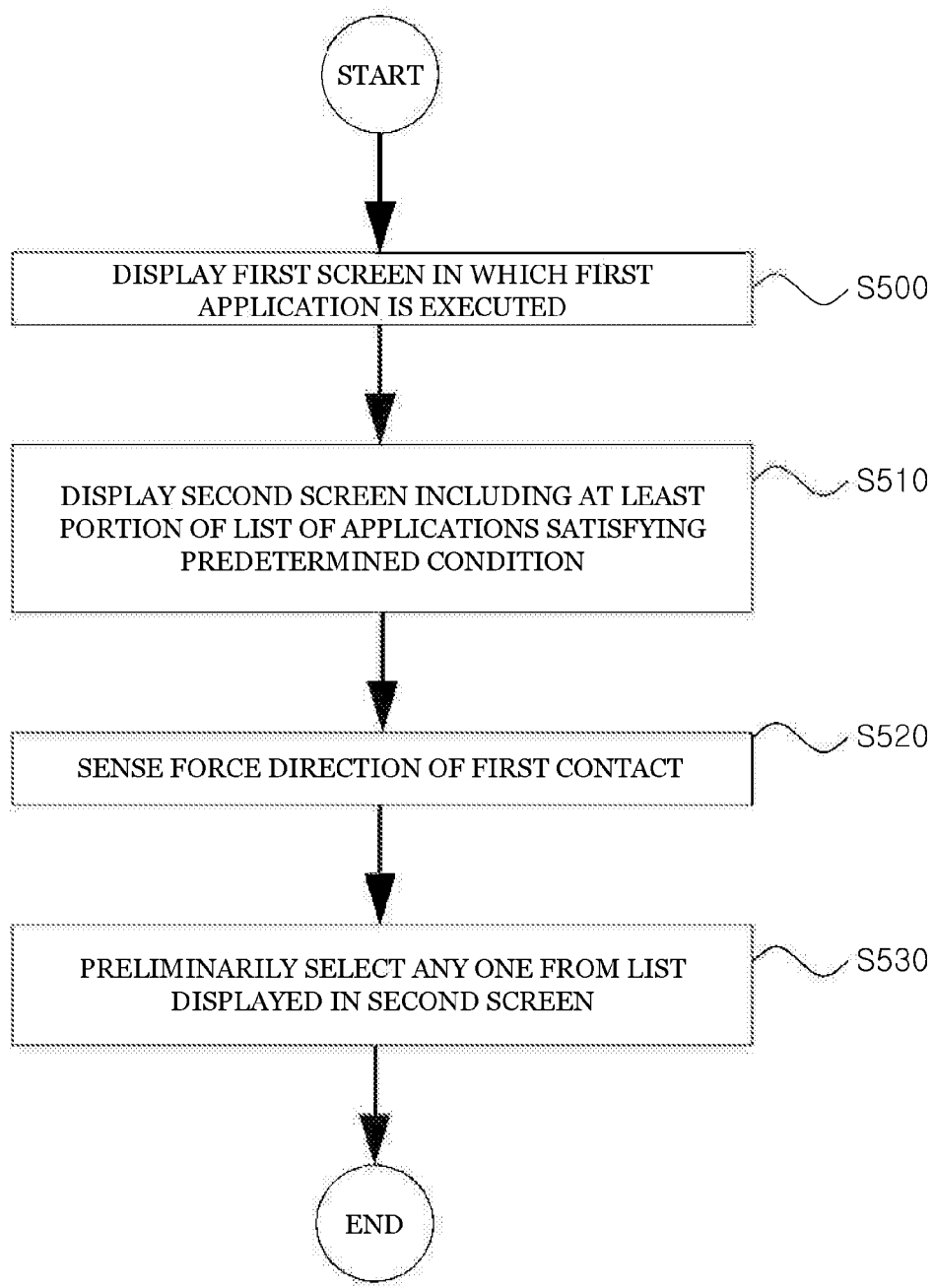
[Fig. 37]

[Fig. 38]
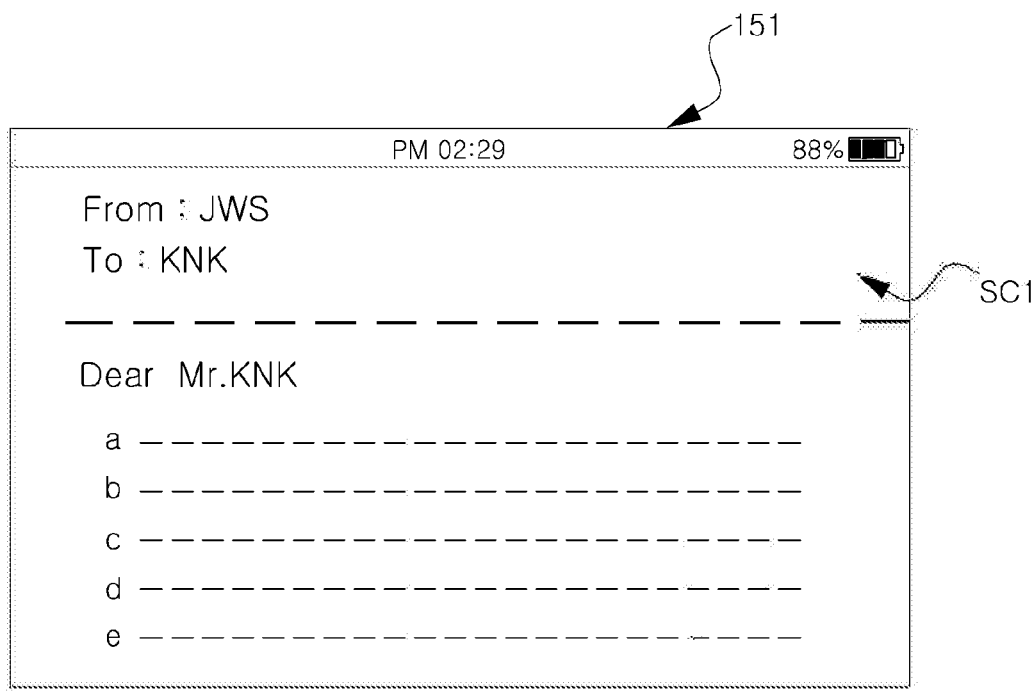
[Fig. 39]
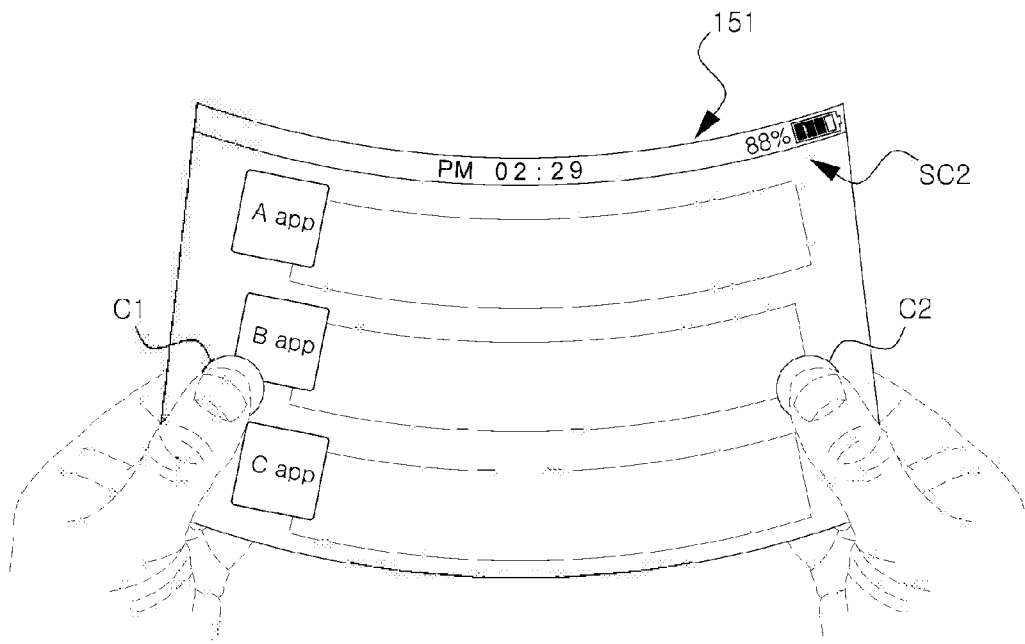

[Fig. 40]
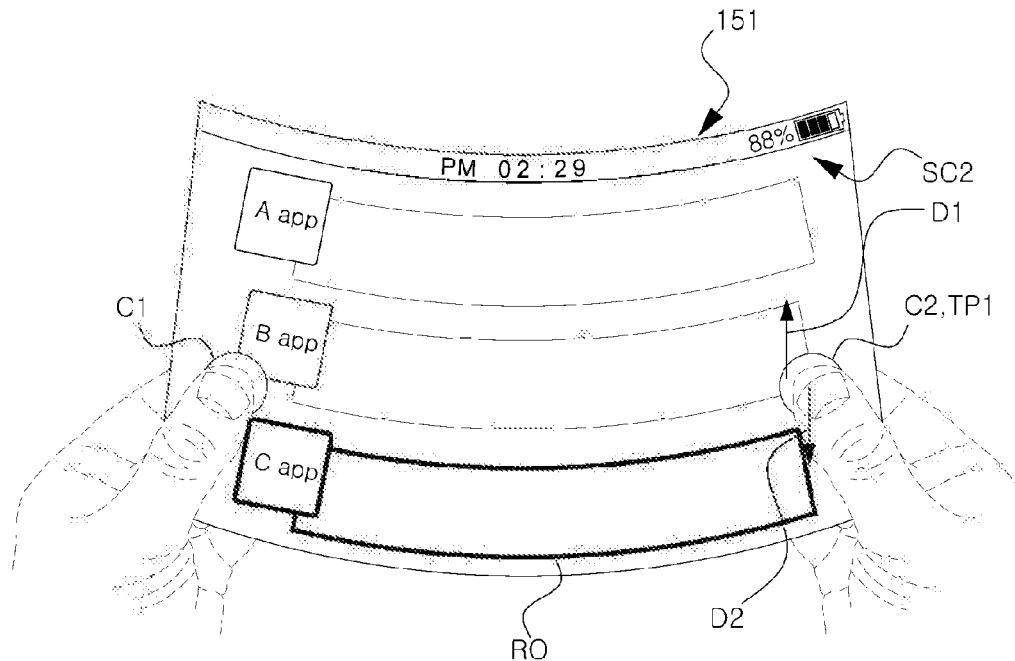
[Fig. 41]
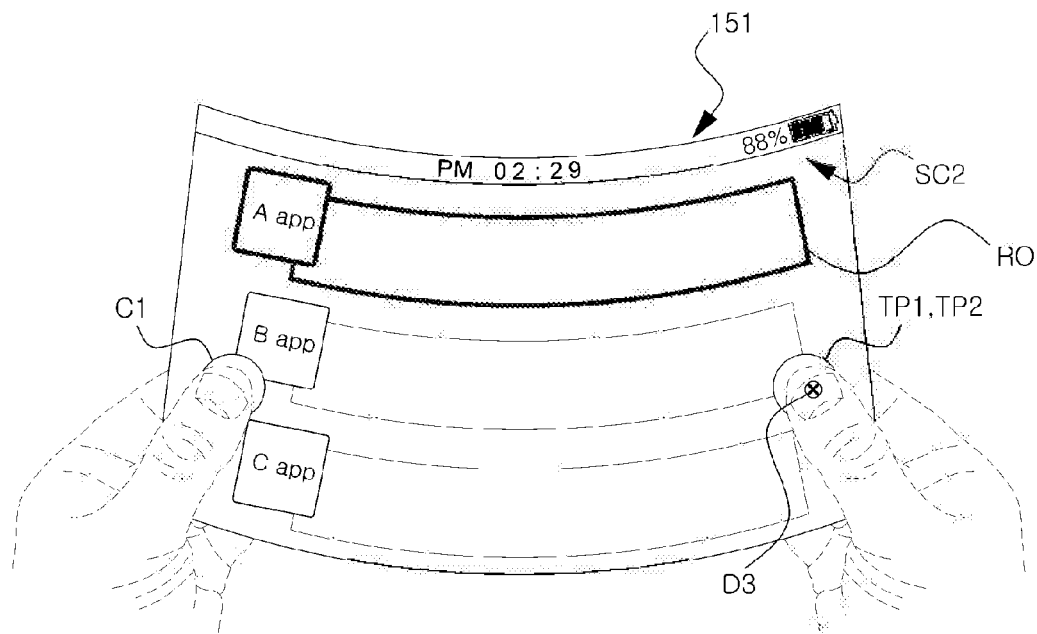

ELECTRONIC DEVICE AND A CONTROL METHOD THEREOF

BACKGROUND OF THE INVENTION

Field of the Invention

The present invention relates to an electronic device for providing a user interface that may be easily and familiarly used by a user who uses a display, and a control method thereof.

Description of the Related Art

These days, there are many types of input devices such as a key pad, a mouse, a track ball, a touch pad, a joystick, a touch screen, or the like in order to manipulate a computer system. Such input devices are used to input data a user desires such as a letter, a symbol, a picture, or the like to a computer system and input a signal for requesting a specific command from the computer system.

Among the various input devices, recently, a touch input means such as a touch screen that can minimize and simplify a device by implementing an input means and an output function together is generally used.

A touch input means may sense contact with a touch region by a contact means such as a human body part of a user or a touch pen and may be classified into a resistive type, a capacitive type, and an optical type. The resistive-type touch input means senses a touch by recognizing a pressure applied to a contact point by the touch, the capacitive-type touch input means senses a touch through a change in an electric charge on a contact point caused by contact of a human body part of a user, and the optical-type touch input means detects a touch position using an infrared light camera and an infrared light lamp.

An initial method for providing a user interface using such a touch input means displays a manipulation means such as multiple buttons on a screen and performs a corresponding function based on a position where contact is sensed. Recently, in order to enhance a user's convenience and operability, a method of combining a variety of information such as a contact start position, a contact start time, a contact end position, and a contact end time, recognizing a user touch gesture such as tapping, dragging, sliding, and pinching, and executing various user commands according to the touch gesture is used. In addition, a method of recognizing multiple touch points in a touch region and executing a user command according to the number of, positions of, combinations of, and distance changes between the touch points.

Furthermore, recently, along with the development of organic light-emitting diode (OLED) technology, flexible display technology was developed. Much research has been conducted on various user interfaces using a flexible display.

However, a conventional user interface method using a touch has difficulty in user manipulation because a user makes a complex touch gesture or touches several points to draw a complex pattern. In addition, much research has been conducted on a user interface using the flexible display by changing the form of the flexible display while the flexible display is gripped with both hands. Thus, when a scheme in which several necessary commands are entered while the flexible display is gripped with both hands and an existing touch input scheme in which a touch gesture or a touch pattern is entered are combined with each other and used, the two-hand grip of the flexible display should be released in order to input a touch. Thus, it will be expected to have limitations.

In addition, the conventional user interface method has limitations in providing an instant response because it takes a certain time to perform and then recognize a touch gesture or touch pattern.

SUMMARY OF THE INVENTION

Technical Problem

The present invention is directed to providing an electronic device for providing a user interface that may overcome limitations of the conventional touch type user interface and may be easily and familiarly used by a user who uses a display, and a control method thereof.

Technical Solution

An electronic device according to an embodiment of the present invention may include a flexible display configured to display a first screen in a first state; a force direction sensing unit configured to sense a force direction of a contact applied to one point by an external object; and a control unit configured to sense an occurrence of a specific data reception event, when the flexible display is changed from the first state to a second state, display a second screen including first information of a first group including information regarding the specific data reception event on the flexible display, and when a force direction of a first contact is acquired in the second state through the force direction sensing unit, display a third screen including second information of the first group including the information regarding the specific data reception event on the flexible display or simultaneously display the second screen and the third screen on the flexible display based on the force direction of the first contact.

The control unit may select, as the first information, information regarding a first specific data reception event sensed within a predetermined time before the flexible display is changed from the first state to the second state from the information regarding the specific data reception event.

The control unit may select, as the second information, information regarding a second specific data reception event sensed within a predetermined time from a point of time at which a first specific data reception event corresponding to the first information is sensed, from the information regarding the specific data reception event.

The control unit may select, as the second information, a list of information regarding specific data reception events sensed within a predetermined time from a point of time at which a first specific data reception event corresponding to the first information is sensed, from the information regarding the specific data reception event.

The control unit may select, as the second information, a list of information regarding other specific data reception events sensed within a predetermined time from a point of time at which a first specific data reception event corresponding to the first information is sensed, from the information regarding the specific data reception event.

When the flexible display is returned from the second state to the first state, the control unit may display the third screen in the returned first state based on a changed force direction of the first contact or a force direction of a second contact that occurs after the force direction of the first contact is sensed in the second state by the force direction sensing unit.

When there is no change in the force direction of the first contact and then the flexible display is returned from the second state to the first state after the second screen and the third screen or the third screen is displayed on the flexible display that is in the second state, the control unit may display the first screen in the returned first state.

An electronic device according to another embodiment of the present invention may include a flexible display configured to display a first screen in a first state; a force direction sensing unit configured to sense a force direction of a contact applied to one point by an external object; and a control unit configured to sense an occurrence of at least one kind of specific data reception event, when the flexible display is changed from the first state to a second state, display a second screen including at least a portion of a list corresponding to the sensed at least one kind of specific data reception event on the flexible display or simultaneously display the first screen and the second screen on the flexible display, and when a force direction of a first contact is acquired in the second state through the force direction sensing unit, provisionally select any one from the list included in the second screen based on the force direction of the first contact.

When the flexible display is changed from the first state to the second state, the control unit may select, as the second screen, at least a portion of a list corresponding to at least one kind of specific data reception event received within a predetermined time after the display is changed from the first state to the second state from the list corresponding to the sensed at least one kind of specific data reception event.

When a specific data reception event other than the at least one kind of specific data reception event sensed in the first state is sensed in the second state, the control unit may additionally display a list corresponding to the specific data reception event sensed in the second state in the second screen.

When the flexible display is returned from the second state to the first state, the control unit may display information corresponding to the list that is provisionally selected in the returned first state based on a changed force direction of the first contact or a force direction of a second contact that occurs after the force direction of the first contact is sensed in the second state by the force direction sensing unit.

When there is no change in the force direction of the first contact and then the flexible display is returned from the second state to the first state after the second screen is displayed on the flexible display that is in the second state, the control unit may display the first screen in the returned first state.

An electronic device according to still another embodiment of the present invention may include a flexible display configured to display a first screen in which a specific application is executed; a force direction sensing unit configured to sense a force direction of a contact applied to one point by an external object; and a control unit configured to when the flexible display is changed from the first state to a second state, display a second screen including first information of a first group including information regarding the specific application on the flexible display, and when a force direction of a first contact is acquired in the second state through the force direction sensing unit, display a third screen including second information of the first group on the flexible display or simultaneously display the second screen and the third screen on the flexible display based on the force direction of the first contact.

The control unit may select information stored by the specific application immediately before the flexible display is changed from the first state to the second state as the second information.

The control unit may select a list of information stored by the specific application before the flexible display is changed from the first state to the second state as the second information.

When the flexible display is returned from the second state to the first state, the control unit may display the third screen in the returned first state based on a changed force direction of the first contact or a force direction of a second contact that occurs after the force direction of the first contact is sensed in the second state by the force direction sensing unit.

When there is no change in the force direction of the first contact and then the flexible display is returned from the second state to the first state after the second screen and the third screen or the third screen is displayed on the flexible display that is in the second state, the control unit may display the first screen in the returned first state.

An electronic device according to still another embodiment of the present invention may include a flexible display configured to display a first screen in which a first application is executed; a force direction sensing unit configured to sense a force direction of a contact applied to one point by an external object; and a control unit configured to, when the flexible display is changed from the first state to a second state, display a second screen including at least a portion of a list of at least one application satisfying a predetermined condition on the flexible display, and when a force direction of a first contact is acquired in the second state through the force direction sensing unit, provisionally select any one from the list included in the second screen based on the force direction of the first contact.

The predetermine condition may be a time difference condition of a time at which a first application is executed.

The predetermine condition may be an execution number condition of the number of times an application other than the first application is executed within a predetermined period.

Advantageous Effects

According to the electronic device and the control method thereof according to the present invention, it is possible to provide a user interface through which the user may easily control layer conversion.

According to the present invention, it is possible to simply control a specific operation by sensing a force direction of a contact and/or touch and using the sensed force direction to control the layer conversion.

According to the present invention, it is possible to provide an intuitive and convenient user interface by using the contact of fingers or the like that grip the display when screens such as applications are converted one by one when multitasking.

BRIEF DESCRIPTION OF THE DRAWINGS

FIG. 1 is a block diagram of an electronic device according to some embodiments of the present invention.

FIG. 2 is a diagram for describing an exterior of an electronic device having a flexible display according to some embodiments of the present invention.

FIG. 3 is a diagram for describing another exterior of an electronic device having a flexible display according to some embodiments of the present invention.

FIG. 4 is a cross sectional view showing a section of the electronic device shown in FIG. 2A taken along line I-I'.

FIG. 5 is a cross sectional view showing a section of the electronic device shown in FIG. 3A taken along line J-J'.

FIG. 6 is a schematic diagram showing an example of a process of detecting a force direction using force intensity according to an embodiment of the present invention.

FIG. 7 is a flowchart for describing a control method of an electronic device according to the present invention.

FIGS. 8 to 21 are diagrams for describing the control method of the electronic device according to the present invention.

FIG. 22 is a flowchart for describing another embodiment of the control method of the electronic device according to the present invention.

FIGS. 23 to 27 are diagrams for describing the other embodiment of the control method of the electronic device according to the present invention.

FIG. 28 is a flowchart for describing still another embodiment of the control method of the electronic device according to the present invention.

FIGS. 29 to 36 are diagrams for describing the still other embodiment of the control method of the electronic device according to the present invention.

FIG. 37 is a flowchart for describing yet another embodiment of the control method of the electronic device according to the present invention.

FIGS. 38 to 41 are diagrams for describing the yet other embodiment of the control method of the electronic device according to the present invention.

DETAILED DESCRIPTION OF THE PREFERRED EMBODIMENT

An electronic device according to an embodiment of the present invention includes a flexible display configured to display a first screen in a first state; a force direction sensing unit configured to sense a force direction of contact applied to one point by an external object; and a control unit configured to sense an occurrence of a specific data reception event, when the flexible display is changed from the first state to a second state, display a second screen including first information of a first group including information regarding the specific data reception event on the flexible display, and when a force direction of a first contact is acquired in the second state through the force direction sensing unit, display a third screen including second information of the first group including the information regarding the specific data reception event on the flexible display or simultaneously display the second screen and the third screen on the flexible display based on the force direction of the first contact.

Modes of the Invention

The above-described objects, characteristics, and advantages of the present invention will be more apparent by the following detailed description with reference to the accompanying drawings. Since the present invention may be variously modified and have several exemplary embodiments, specific exemplary embodiments will be shown in the accompanying drawings and be described in detail in a detailed description.

In the drawings, the thickness of layers and regions may be exaggerated for clarity. Also, when it is mentioned that an element or layer is 'on' another element or layer, the element or layer may be formed directly on another element or layer, or a third element or layer may be interposed therebetween. Like reference numerals refer to like elements throughout the specification.

Moreover, detailed descriptions about well-known functions or configurations associated with the present invention will be ruled out in order to not unnecessarily obscure the essence of the present invention. It should also be noted that, although ordinal numbers (such as first and second) are used in the following description, they are used only to distinguish similar components.

Hereinafter, an element according to the present invention will be described in detail with reference to the accompanying drawings. The suffixes "module" and "unit" for elements used in the following description are given or used interchangeably only for facilitation of preparing this specification, and thus they are not granted a specific meaning or function.

An electronic device described herein may include a mobile terminal, such as a cellular phone, a smartphone, a laptop computer, a digital broadcasting terminal, a personal digital assistant (PDA), a portable multimedia player (PMP), and a navigation device, as well as a stationary terminal, such as a digital TV and a desktop computer.

The control method of an electronic device according to the present invention may be applied to a device having means capable of sensing a touch and/or a contact of an external object (e.g., some part of a human body such as a finger of a user, and/or a touch pen).

The means capable of sensing the touch and/or the contact may be a general touch input means such as a touch screen or a touch pad. However, the sensing means may further sense a force direction of the touch and/or the contact in addition to a function of sensing a position of the touch and/or the contact that may be implemented by the touch screen and/or touch pad.

In this case, the means capable of sensing the touch and/or the contact may also be formed integrally with the conventional touch screen and configured to be able to sense the touch and/or the contact with the touch screen. Alternatively, the means may be included in an element such as a portion of a housing of a device to which the control method of an electronic device according to the present invention is applied or a grip portion that may be provided separately to a portion of a boundary of a touch screen and may be configured to sense a touch and/or a contact with the portion of the housing and/or the grip portion. That is, it should be noted that the means capable of sensing the touch and/or the contact may be disposed to sense the force direction of the touch and/or the contact with another component rather than the touch screen and/or the touch pad.

The control method of an electronic device according to the present invention may be applied to any type of device as long as the device includes the means capable of sensing the touch and/or the contact. That is, the device to which the control method of an electronic device according to the present invention may be applied may include a smartphone, a cellular phone, a tablet PC, a notebook, a desktop, a PDA, etc.

In the following description, an electronic device according to some embodiments of the present invention will be simply described, and then the control method of an electronic device according to some embodiments of the present invention will be described in detail.

Configuration of an Electronic Device

FIG. 1 is a block diagram of an electronic device according to some embodiments of the present invention.

An electronic device 100 may include a wireless communication unit 110, an audio/video (A/V) input unit 120, a user input unit 130, a sensing unit 140, an output unit 150, a memory 160, an interface unit 170, a control unit 180, a power supply unit 190 and the like. FIG. 1 shows the electronic device 100 having components, although all the illustrated components are not a requirement, and more or less components may alternatively be implemented.

The components will be described below in sequence.

The wireless communication unit 110 may include one or more modules that permit wireless communication between the electronic device 100 and a wireless communication system or a network within which the electronic device 100 is located. For example, the wireless communication unit 110 may include a broadcast receiving module 111, a mobile communication module 112, a wireless Internet module 113, a short-range communication module 114, a location information module 115 and/or the like.

The broadcast receiving module 111 receives a broadcast signal and/or broadcast associated information from an external broadcast managing server via a broadcast channel.

The broadcast channel may include a satellite channel and a terrestrial channel. The broadcast managing server may include a server that generates and transmits a broadcast signal and/or broadcast associated information, or a server that receives a pre-generated broadcast signal and/or broadcast associated information and transmits the pre-generated broadcast signal and/or the broadcast associated information to a terminal. The broadcast signal may include not only a TV broadcast signal, a radio broadcast signal, a data broadcast signal, but also a mixed signal of a data broadcast signal and a TV broadcast signal or a radio broadcast signal.

The broadcast associated information may include information on a broadcast channel, a broadcast program, or a broadcast service provider. The broadcast associated information may be provided over a communication network. In this case, the broadcast associated information may be received by the mobile communication module 112.

The broadcast associated information may include various forms. For example, the information may be provided in a form such as an electronic program guide (EPG) of Digital Multimedia Broadcasting (DMB) or an electronic service guide (ESG) of Digital Video Broadcasting-Handheld (DVB-H).

The broadcast receiving module 111 may receive a broadcast signal using various broadcast systems and may receive a digital broadcast signal using a digital broadcast system such as Digital Multimedia Broadcasting Terrestrial (DMBT), Digital Multimedia Broadcasting Satellite (DMBS), Media Forward Link Only (MediaFLO), Digital Video Broadcast Handheld (DVBH), Integrated Services Digital Broadcast Terrestrial (ISDBT), etc. It will be appreciated that the broadcast receiving module 111 may be configured to be suitable for another broadcast system in addition to the above-described digital broadcast systems.

The broadcast signal and/or the broadcast associated information received through the broadcast receiving module 111 may be stored in the memory 160.

The mobile communication module 112 transmits wireless signals to or receives wireless signals from at least one of a base station, an external terminal, and a server over a mobile communication network. The wireless signals may include voice call signals, video call signals, or various types of data according to transmission and reception of text and/or multimedia messages.

The wireless Internet module 113 is a module for supporting wireless Internet access. This module may be internally or externally coupled to the electronic device 100. Examples of the wireless Internet technology may include Wireless LAN (WLAN; Wi-Fi), Wireless Broadband (WIBRO), World Interoperability for Microwave Access (Wimax), High Speed Downlink Packet Access (HSDPA), etc.

The short-range communication module 114 is a module for supporting short-range communications. Examples of the short-range communication technology include Bluetooth, Radio Frequency Identification (RFID), Infrared Data Association (IrDA), Ultra-WideBand (UWB), ZigBee, WiHD, WiGig, etc.

The location information module 115 is a module for identifying or otherwise obtaining a location of the electronic device 100. A Global Position System (GPS) module is a representative example of the location information module. According to the current technology, the GPS module 115 may calculate information on distances between one point or object and three or more satellites, and information on a time when distance information is measured, and apply trigonometry to the obtained distance information to obtain three-dimensional position information on the point or object according to latitude, longitude, and altitude at a predetermine time. Furthermore, a method of calculating position and time information using three satellites and correcting the calculated position and time information using another satellite may also be used. In addition, the GPS module 115 may continuously calculate a current position in real time and calculate velocity information using the location information.

Referring to FIG. 1, the A/V input unit 120 is configured to receive an audio or video signal, and may include a camera 121, a microphone 122, etc. The camera 121 processes an image frame of a still picture or video obtained by an image sensor in a video call mode or image capturing mode. The processed image frame may be displayed on a display 151.

The image frame processed by the camera 121 may be stored in the memory 160 or transmitted to the outside via the wireless communication unit 110. The camera 121 may be provided as two or more according to an aspect of the configuration of the terminal.

The microphone 122 may receive an external audio signal in a phone call mode, a recording mode, and a voice recognition mode and may process and convert the received audio signal into electric voice data. In the phone call mode, the processed voice data may be converted and output in a form that is transmittable to a mobile communication base station through the mobile communication module 112. Various noise removal algorithms for removing noise generated while the external audio signal is received may be implemented in the microphone 122.

The user input unit 130 generates input data used for a user to control an operation of a terminal. The user input unit 130 may include a keypad, a dome switch, a touch pad (e.g., static pressure/capacitance), a jog wheel, or a jog switch.

However, the user input unit 130 may include a force direction sensing unit 131 that is capable of sensing a force direction of a touch and/or a contact. The force direction sensing unit 131 may not only include a function of sensing a position of the touch and/or the contact, which may be implemented by a general touch screen and/or touch pad, but also be the means further capable of detecting a force direction of the touch or the contact.

The term "force direction" used herein may conceptually include a force acting in a direction parallel to a touch surface (hereinafter referred to as a shear force), which cannot be detected by a conventional touch sensor. That is, the force direction sensing unit 131 according to an embodiment of the present invention may also sense a direction of a shear force acting in a direction parallel to the touch surface in addition to a direction of a force applied in a direction perpendicular to the touch surface.

The force direction sensing unit 131 may be formed integrally with a conventional touch screen and be configured to be capable of sensing the touch and/or contact with the touch screen. Alternatively, the force direction sensing unit 131 may be included in an element such as a portion of a housing of a device to which the control method of an electronic device according to the present invention is applied or a grip portion that may be provided separately to a portion of a boundary of a touch screen and may be configured to sense a touch and/or a contact with the portion of the housing and/or the grip portion. The detailed operation of the force direction sensing unit 131 will be described in detail later.

The sensing unit 140 senses a current status (or state) of the electronic device 100, such as an opened or closed state of the electronic device 100, a location of the electronic device 100, the presence or absence of a user contact with the electronic device 100, the orientation of the electronic device 100, and acceleration and/or deceleration of the electronic device 100, to generate a sensing signal for controlling the operation of the electronic device 100. For example, when the electronic device 100 is implemented as a slide type mobile phone, the sensing unit 140 may sense whether the slide phone is opened or closed. In addition, the sensing unit 140 may also be responsible for a sensing function associated with whether the power supply unit 190 supplies power or whether the interface unit 170 is coupled with an external device. The sensing unit 140 may include a posture sensor 141 and/or a proximity sensor 142.

The output unit 150 is intended to generate an output related to visual, auditory, and tactile senses and may include a display 151, an audio output module 152, an alarm 153, and a haptic module 154.

The display 151 outputs information processed by the electronic device 100. For example, when the electronic device is in a phone call mode, the display 151 displays a user interface (UI) or a graphic user interface (GUI), which is associated with the call. When the electronic device 100 is in a video call mode or an image capturing mode, the display 151 displays a captured image and/or a received image, a UI, or a GUI.

The display 151 may include at least one of a liquid crystal display (LCD), a thin film transistor-LCD (TFT-LCD), an organic light emitting diode (OLED) display, a flexible display, and a three-dimensional (3D) display.

Some of the above displays may be configured as a transparent or light-transmission type display through which the outside may be viewed. This may be called a transparent display. An example of the transparent display includes a transparent LCD. A rear portion of the display 151 may also have a light-transmission structure. Such a structure allows a user to view an object located at the rear portion of the terminal body through a portion which is occupied by the display 151 of the terminal body.

According to a type of implementing the electronic device 100, two or more display units 151 may be provided. For example, a plurality of display units may be spaced apart or integrally formed on one surface of the electronic device 100, and may also be arranged on different surfaces of the electronic device 100. Alternatively, the display 151 may be logically divided into two or more regions.

In a case where the display 151 and a sensor for sensing a touch operation (hereinafter referred to as a "touch sensor") are mutually layered (hereinafter, simply referred to as a "touch screen"), the display 151 may be used as an input device, as well as an output device. The touch sensor may have the form of, for example, a touch film, a touch sheet, or a touch pad.

The touch sensor may be configured to convert a variation in capacitance that occurs at a specific region of the display 151 or a pressure exerted at a specific region of the display 151 into an electrical input signal.

When a touch input is applied to the touch sensor, a signal or signals corresponding to the touch input are sent to a touch controller. The touch controller processes the signal(s) to generate corresponding data, and transmits the data to the control unit 180. Accordingly, the control unit 180 may determine what region of the display 151 has been touched.

Referring to FIG. 1, the proximity sensor 142 may be provided to an internal region of an electronic device enclosed by the touch screen or around the touch screen. The proximity sensor 142 denotes a sensor that detects a presence or non-presence of an object approaching a predetermined detecting surface or an object existing around the proximity sensor 142 using the strength of an electromagnetic field of the object or an infrared ray without mechanical contact. The proximity sensor 142 has a longer life and a wider utility than a contact type sensor.

Examples of the proximity sensor 142 include a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like.

When the touch screen is a capacitive-type touch screen, the proximity of a pointer may be detected using a variation of an electric field according to the proximity of the pointer. In this case, the touch screen (i.e., touch sensor) may be classified as a proximity sensor.

In the following description, for convenience of description, in order to allow the pointer to be recognized as being positioned on the touch screen, an action where a pointer approaches without contacting the touch screen is called a "proximity touch," and an action where a pointer actually touches the touch screen is called a "contact touch." The meaning of the position on the touch screen proximity touched by the pointer may define a position of the pointer that vertically opposes the touch screen when the pointer performs the proximity touch. However, when the proximity touch and the contact touch need not be described separately, the term "touch" or "touch input" includes both an input by the proximity touch and an input by the contact touch.

The proximity sensor 142 may detect a proximity touch and a proximity touch pattern (e.g., a proximity touch distance, a proximity touch direction, a proximity touch speed, a proximity touch duration, a proximity touch position, a proximity touch movement state, etc.). Information corresponding to the detected proximity touch action and the detected proximity touch pattern may be output to the touch screen.

The audio output module 152 may function to output audio data that is received from the wireless communication unit 110 or is stored in the memory 160 in a call-receiving mode, a call-placing mode, a recoding mode, a voice recognition mode, a broadcast reception mode and/or the like. The audio output module 152 outputs an audio signal relating to a particular function (e.g., a call received, a message received, etc.) performed by the electronic device 100. The audio output module 152 may include a receiver, a speaker, a buzzer, and so on.

The alarm 153 outputs a signal for announcing an occurrence of a particular event of the electronic device 100.

Examples of the event may include call reception, message reception, key signal input, and touch input. The alarm 153 may output a signal for announcing the event occurrence by way of a video signal, an audio signal, or in another form, for example, as vibration. The video signal or the audio signal may be output via the display 151 or the audio output module 152.

The haptic module 154 generates various tactile effects that may be sensed by a user. Vibration may be representative of the tactile effects generated by the haptic module 154. An intensity and a pattern of the vibration generated by the haptic module 154 are controllable. For example, different vibrations may be output by being combined or may be output in sequence.

The haptic module 154 may generate various tactile effects as well as vibration. For example, the haptic module 154 may generate an effect of stimulation via the arrangement of pins vertically moving against a contact skin surface, an effect of stimulation via a suction power of air through an injection/suction hole, an effect of stimulation via rubbing a skin surface, an effect of stimulation via contact with an electrode, an effect of stimulation via an electrostatic force, an effect of stimulation via a warm or cold sense using an endothermic or exothermic device and/or the like.

The haptic module 154 may enable a user to sense a tactile effect through a muscle sense of a finger of the user, an arm or the like as well as to transfer the tactile effect through a direct contact. Two haptic modules 154 or more may be provided based on a corresponding configuration type of the mobile terminal 100.

The memory 160 may store programs for operating the control unit 180. The memory 160 may temporarily store input/output data (e.g., phonebook data, message data, a still image, and a video). The memory 160 may store data for various patterns of vibration and sound that are output in case of a touch input to the touch screen.

The memory 160 may include at least one of storage devices including a flash memory, a hard disk, a multimedia card micro type memory, a card-type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, and a magnetic or optical disk. The electronic device 100 may operate in association with a web storage for performing a storage function of the memory 160 on the Internet.

The interface unit 170 functions as a passage with all external devices connected to the electronic device 100. The interface unit 170 receives data from the external devices or is supplied with power, and then transfers the data or power to respective elements of the electronic device 100 or enables data within the electronic device 100 to be transferred to the external devices. For example, the interface unit 170 may include a wired/wireless headset port, an external charger port, a wired/wireless data port, a memory card port, a port for coupling to a device having an identity module, an audio input/output (I/O) port, a video I/O port, an earphone port, and/or the like.

The identity module is a chip for storing various kinds of information for authenticating a use authority of the electronic device 100 and may include a User Identify Module (UIM), a Subscriber Identity Module (SIM), a Universal Subscriber Identity Module (USIM) and/or the like. A device having an identity module (hereinafter referred to as an "identity device") may be manufactured as a smart card. The identity device may be connectible to the terminal 100 via a port.

When the electronic device 100 is connected to an external cradle, the interface unit 170 may become a passage for supplying the electronic device 100 with power from the cradle or a passage for delivering various command signals input from the cradle by the user to the electronic device 100. Each of the various command signals input from the cradle or the power may operate as a signal enabling the electronic device 100 to recognize that it is correctly loaded in the cradle.

The control unit 180 typically controls overall operations of the electronic device 100. For example, the control unit 180 performs control and processing associated with voice calls, data communications, video calls, etc. The control unit 180 may include a multimedia module 181 that provides multimedia playback. The multimedia module 181 may be implemented as part of the control unit 180, or may be implemented as a separate component.

The control unit 180 may perform a pattern recognizing process for recognizing a writing input or a picture drawing input carried out on the touch screen as characters or images, respectively.

The power supply unit 190 is supplied with internal power or external power by control of the control unit 180 and supplies a power required by an operation of each component.

Embodiments may be implemented in a computer-readable medium using, for example, computer software, hardware, and/or some combination thereof.

For hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and other electronic units designed to perform functions described herein. Embodiments may also be implemented by or in conjunction with the control unit 180.

For software implementation, embodiments may be implemented with separate software modules, such as procedures and functions, each of which may perform one or more of the functions and operations described herein. The software codes may be implemented with a software application written in any suitable programming language. The software codes may be stored in the memory 160 and executed by the control unit 180.

Flexible Display

A flexible display that may be applied to the electronic device 100 according to some embodiments of the present invention and the electronic device 100 to which the flexible display has been applied will be described below with reference to FIGS. 2 to 5. The electronic device 100 to which the flexible display has been applied will be described below. However, it should be noted that a control method of an electronic device according to the present invention is not necessarily applied only to an electronic device having a flexible display, and may be applied to an electronic device having a flat panel display, etc.

As described above, the electronic device 100 according to the present invention may include a display 151 that is implemented as the flexible display.

The flexible display is a display device that is formed of a flexible material configured to be bent or folded. In order words, the flexible display is a light and unbreakable display device that is manufactured on a bendable, foldable, or rollable substrate like a paper while maintaining display characteristics of an existing flat panel display. The flexible display may be called a bendable display and a flexible display.

Such a flexible display may be implemented using a TFT-LCD, an OLED, electrophoretic or laser induced thermal imaging (urn) technology or the like.

In addition, electronic paper may be used as the flexible display. The electronic paper is a display device to which characteristics of ink and paper are applied and is also referred to as e-paper. Unlike a traditional flat panel display that provides backlight illumination to pixels, the electronic paper may use reflected light like general paper. Once an image or text is formed, the shape of the image or text may be maintained even without additional power supply.

The above-described flexible display is light and unbreakable. When the flexible display is applied to a mobile terminal, the flexible display has various shapes and arrangements, and thus may provide a mobile terminal with various forms and corresponding functions.

FIG. 2 is a diagram for describing an exterior of an electronic device having a flexible display according to some embodiments of the present invention.

An example in which the flexible display is provided in a mobile terminal will be simply and clearly described with reference to FIG. 2. Other elements that may be additionally included in the mobile terminal will be omitted in order to provide intuitive understanding.

FIG. 2 shows an example of an electronic device having the flexible display according to some embodiments of the present invention.

An electronic device 100 shown in FIG. 2 has two bodies B1 and B2. The two bodies B1 and B2 may be formed of a rigid material and thus may not be flexible.

A display 151 implemented with a flexible display may be provided at one side of the two bodies B1 and B2. Different flexible displays that are physically distinct may be arranged at each of the two bodies B1 and B2. However, preferably, one flexible display 151 may be arranged therein.

The two bodies B1 and B2 may be connected to each other by a hinge H. Furthermore, one of the two bodies B1 and B2 may be coupled with the other to rotate with respect to the hinge H. This means that the two bodies B1 and B2 may be coupled in a foldable manner.

FIG. 2A shows that the two bodies B1 and B2 are completely unfolded. As shown in FIG. 2A, a state in which the two bodies B1 and B2 are completely unfolded is simply referred to as a "flat state."

FIG. 2B shows that the two bodies B1 and B2 are slightly bent since the body B2 is slightly rotated. FIG. 2C shows that the two bodies B1 and B2 are completely folded. As shown in FIGS. 2B and 2C, a state in which the two bodies B1 and B2 are bent and coupled together is simply referred to as a "bending state." However, for convenience of description, as shown in FIG. 2C, a state in which the two bodies B1 and B2 are completely folded may be referred to as a "folded state."

As the two bodies B1 and B2 are changed from the flat state to the bending state, the flexible display 151 may also be bent.

The term "flat state" or "bending state" may be used according to a predetermined criterion or depending on whether the display 151 is completely unfolded or is bent. For example, as shown in FIG. 2A, it is possible to express "the display 151 is flat" or "the display 151 is in a flat state."

As shown in FIGS. 2B and 2C, it is possible to express "the display 151 is bent" or "the display 151 is in a bending state."

FIG. 2 shows a case in which there are two bodies that are rotatably coupled. However, the electronic device 100 need not necessarily be composed of two bodies, and may be composed of three or more bodies. In this case, one body may be rotatably coupled with other adjacent bodies.

FIG. 3 is a diagram for describing another exterior of an electronic device having a flexible display according to some embodiments of the present invention.

The exterior of the electronic device described with reference to FIG. 2 includes the first body B1 and the second body B2 formed of a rigid material and connected by the hinge H. However, unlike that shown in FIG. 2, the exterior of the electronic device shown in FIG. 3 may include the third body B3 formed of a flexible material like the flexible display.

In this case, the degree of freedom of a flexing operation of the flexible display may increase significantly compared to that of the flexible display shown in FIG. 2 in which a folding position of the flexible display cannot be varied through the rotation of the first body B1 and the second body B2 which are rigid.

For example, as shown in FIG. 3B, the flexible display may be bent and transformed with respect to the y-axis of a Cartesian coordinate that may be set on a display surface of the electronic device 100. In addition, as shown in FIG. 3C, the flexible display may be bent and transformed with respect to the x-axis of the Cartesian coordinate that may be set on the display surface of the electronic device 100.

As another example, when flexing is performed as shown in FIG. 3B or when flexing is performed as shown in FIG. 3C, a bending position may not be fixed.

As still another example, the display of the electronic device 100 may be bent such that only an upper right corner of the electronic device 100 shown in FIG. 3A is partially flexed.

FIG. 4 is a cross sectional view showing a section of the electronic device shown in FIG. 2A taken along line I-I'. The thickness of layers of the bodies B1 and B2 and the display 151 is exaggeratedly shown in FIG. 4. The layers may be thicker or thinner than those shown in FIG. 4. A relative thickness of each layer may be different from that shown in FIG. 4. That is, it is shown that the display 151 has a smaller thickness than the bodies B1 and B2. However, the bodies B1 and B2 may be thinner than the display 151. As shown in FIG. 4A, the electronic device 100 according to some embodiments of the present invention may be configured such that a sum of the areas of the bodies B1 and B2 is the same as the area of the display 151 when seen from a direction V shown in FIG. 4. Alternatively, as shown in FIGS. 4B and 4C, the electronic device 100 may be configured such that the sum of the areas of the bodies B1 and B2 is greater than the area of the display 151.

As shown in FIG. 4B, the electronic device 100 according to some embodiments of the present invention may have the bodies B1 and B2 having edges that protrude in a direction in which the display 151 is disposed. Furthermore, as shown in FIG. 4C, the edges may further extend horizontally to partially overlap the display 151.

Although not shown, other elements may be interposed between each of the bodies B1 and B2 and the display 151. Furthermore, another element may be further disposed on the display 151. In addition, another element may also be further disposed below the bodies B1 and B2. However, such elements are not directly associated with the description of the present invention, and thus a detailed description thereof will be omitted.

FIG. 5 is a cross sectional view showing a section of the electronic device shown in FIG. 3A taken along line J-J'. The thicknesses of layers of a body B3 and the display 151 are exaggeratedly shown in FIG. 5. The layers may be thicker or thinner than those shown in FIG. 5. A relative thickness of each layer may be different from that shown in FIG. 5. That is, it is shown that the display 151 has a smaller thickness than the body B3. However, the body B3 may be thinner than the display 151.

As shown in FIG. 5A, the electronic device 100 according to some embodiments of the present invention may be configured such that a sum of the areas of the bodies B1 and B2 is the same as that of the display 151 when seen from a direction V shown in FIG. 5. Alternatively, as shown in FIGS. 5B and 5C, the electronic device 100 may be configured such that the area of the third body B3 is greater than the area of the display 151.

As shown in FIG. 5B, in the electronic device 100 according to some embodiments of the present invention, an edge of the third body B3 may protrude to be wider than the display 151. Furthermore, as shown in FIG. 5C, the edge may extend horizontally to partially overlap the display 151.

Although not shown, other elements may be interposed between the body B3 and the display 151. Furthermore, another element may be further disposed on the display 151. In addition, another element may be further disposed below the body B3. However, such elements are not directly associated with the description of the present invention, and thus a detailed description thereof will be omitted.

Each region of the electronic device 100 that is shown in FIGS. 4 and 5 by dashed lines is a grip portion GP that is mainly grasped by a user. The grip portion GP denotes each of the regions illustrated in FIGS. 4 and 5 by dashed lines. However, the position of the grip portion GP is not limited thereto. For example, when the electronic device 100 is flexed as shown in FIG. 3C, it should be noted that the grip portion GP may be an upper side or a lower side of the electronic device 100.

In addition, according to the electronic device 100 shown in FIGS. 2 to 5, it is shown that the first to third bodies B1, B2, and B3 are arranged to overlap the entire region of the display 151. However, the first to third bodies B1, B2, and B3 may be arranged to partially overlay the display 151. For example, a rigid body may be provided only to the position of the grip portion GP shown in FIGS. 4 and 5. The rigid body may not be provided to a center region of the display 151.

As described above, the electronic device 100 may sense a state of the display 151. To this end, the electronic device 100 may include a sensor for sensing whether the display 151 is folded (in a bending state) or unfolded (in a flat state) (hereinafter, whether the display 151 is bent). Furthermore, the sensor may sense a position at which the display 151 is folded (hereinafter referred to as a "bending position") and may sense a degree to which the display 151 is folded (hereinafter referred to as a "bending degree").

In this case, the above-described sensor for sensing whether the flexible display 151 is bent may be included in the flexible display. The sensor may be arranged in a plurality. When the plurality of sensors are provided, the sensors may be arranged to be spaced apart from each other on at least one edge of the flexible display.

In this case, the above-described sensor for sensing whether the flexible display 151 is bent may be provided in the first to third bodies B1 to B3.

Here, the sensor for sensing whether the flexible display is bent is referred to as a "bending sensor" for convenience of description. The present invention is not limited to the implementation method and form of such a bending sensor. However, it is preferable that the control unit 180 may use electric signals to sense the degree and/or position of the bending of the flexible display.

When the drawings needed to describe embodiments of the present invention are shown, as shown in FIG. 3, an electronic device including a flexible display will be described as an example, unless context dictates otherwise. However, this is for convenience of description of the present invention and does not mean that the present invention is not applied to the electronic device 100 having an exterior that is shown in FIG. 2.

Force Direction Sensing Unit

A force direction sensing unit 131 that may be applied to the electronic device 100 according to some embodiments of the present invention will be described below with reference to FIG. 6.

As described above, the term "force direction" used herein includes a direction of shear force applied to a touch surface, that is, a direction parallel to force acting on the touch surface, which cannot be detected by a conventional touch sensor. That is, upon a touch and/or contact of an external object, the force direction sensing unit 131 may also sense shear force generated on the touch surface by the touch and/or contact.

The force direction sensing unit 131 according to the present invention may include a sensor array SA composed of unit sensors for sensing a force direction.

For example, the sensor array SA is arranged in a region where a force direction is to be sensed. Accordingly, when the region where the sensor array SA is arranged is touched and/or contacted, the force direction sensing unit 131 may sense a force direction of the touch and/or contact.

That is, the sensor array SA may be arranged in the region where the force direction of the touch and/or contact is to be sensed. For example, when the electronic device 100 includes a touch screen, a conventional touch input and a direction of the touch may be combined and then used to operate the electronic device 100. In this case, the sensor array SA may be arranged in a region of the display 151 (i.e., a touch screen region) of the electronic device 100. Thus, information regarding the touch input that may be acquired from the touch screen and force direction information obtained from the force direction sensing unit 131, which is a sensor array SA set, may be combined by the electronic device 100 and usefully used to operate the electronic device 100.

As another example, the sensor array SA is arranged in the first, second, and third bodies B1, B2, and B3. Accordingly, the electronic device 100 may sense the force direction of the touch and/or contact with the first, second, and third bodies B1, B2, and B3, and the sensed information may be usefully used to operate the electronic device 100.

In particular, when a control method of an electronic device according to the present invention is applied to an electronic device 100 having a flexible display, the sensor array SA may be arranged in a grip portion GP (see FIGS. 4 and 5) of the electronic device 100. In this case, the sensor array SA may be provided in a touch screen region of the grip portion GP and also may be provided in a region of the first, second, and third bodies B1, B2, and B3 included in the grip portion GP. However, even when the sensor array SA is applied to the electronic device 100 having a flexible display, it should be noted that the sensor array SA need not necessarily be provided only to the grip portion GP.

The force direction sensing unit 131 may sense a variety of information regarding a touch and/or contact to a force direction sensing region (force direction detecting area; FDDA) determined by a region in which the sensor array SA is provided. For example, the force direction sensing unit 131 may sense one or more of the presence of contact of an external object OB to the force direction sensing region, a position of the contact, a force intensity upon the contact (that is, a force intensity of a touch and/or contact), and a force direction (that is, a force direction of the touch and/or contact).

Each sensor in the sensor array SA included in the force direction sensing unit 131 may sense one or more of the presence of the contact of the external object OB to the sensor, the position of the contact, the force intensity upon the contact, and the force direction.

Information corresponding to one or more of the presence of the contact with one point of a touch region, the position of the contact, the force intensity upon the contact, and the force direction which are sensed by the force direction sensing unit 131 may be transferred to the control unit 180 and/or a separate touch event processing module (not shown).

The control unit 180 and/or the touch event processing module may set a contact region having a certain area around a point at which the touch and/or contact with the force direction sensing region is sensed, compare force intensities between a plurality of sensing points (e.g., points at which unit sensors constituting the sensor array SA are arranged) that are present in the contact region, and determine a force directions applied to the points. The determination of the direction of the forces by the touch event processing module may be achieved as illustrated in FIG. 6.

FIG. 6 is a schematic diagram showing an example of a process of detecting a force direction using force intensity according to an embodiment of the present invention.

Referring to FIG. 6, the control unit 180 and/or the touch event processing module may determine the force direction according to an intensity distribution of forces detected at a plurality of sensing points included in the contact region (touch area; TA). In particular, the control unit 180 may determine, as the force direction, a direction of a sensing point at which the greatest force intensity is detected on the basis of a center O of the touch area TA.

For example, when the touch and/or contact of the external object OB to one point of a force direction detection area FDDA is achieved, the touch area TA having a predetermined area with respect to the surface of the force direction detection area FDDA and the contact point of the external object OB may be set or extracted. The touch area TA may be set as a range of a predetermined area with respect to a specific coordinate (e.g., a center coordinate) of the one point or may be set by connecting multiple adjacent sensing points at which user contacts are sensed among multiple sensing points included in the force direction sensing region FDDA.

In addition, force intensities F1 to F5 detected at the multiple sensing points of the set or an extracted touch area TA are detected. The greater force intensity may be detected at the sensing point of the direction in which a user applies force in the touch area TA.

Accordingly, the electronic device 100 according to the present invention detects, as a force direction FD applied to the touch area TA, a direction of a sensing point having the greatest force intensity among the multiple sensing points from the center point of the touch area TA.

Accordingly, when the force direction sensing region FDDA is touched and/or contacted by the external object OB, the electronic device 100 may use the force direction sensing unit 131 to sense a position of the touch and/or contact and also a direction in which shear force is applied from the position of the touch and/or contact.

Various embodiments of a control method of an electronic device according to the present invention will be described below using the electronic device 100 that has been described with reference to FIGS. 1 to 6.

However, for convenience of description, the embodiments of the control method of an electronic device according to the present invention will be described using the electronic device 100 that has been described with reference to FIGS. 1 to 6. Accordingly, the control method of an electronic device according to the present invention is not restricted to be applied only to the electronic device 100 that has been described with reference to FIGS. 1 to 6. That is, the control method of an electronic device according to the present invention may be applied to an electronic device that does not have at least some of the elements of the electronic device 100 that has been described with reference to FIGS. 1 to 6. On the other hand, the control method of an electronic device according to the present invention may also be applied to an electronic device that has more elements than the electronic device 100.

Furthermore, in various embodiments of the control method of an electronic device according to the present invention, the control method of an electronic device according to the present invention may be applied to an electronic device that senses a force direction in a scheme other than the scheme described with reference to FIG. 6. That is, the control method of an electronic device according to the present invention, which will be described below, may be applied to an electronic device having a sensor that may sense a force direction of a touch and/or contact in a method other than the method, which has been described with reference to FIG. 6, for sensing shear force applied to the touch surface.

Control Method of an Electronic Device

1. Method of Providing a First User Interface

A control method of an electronic device according to the present invention will be described below using the electronic device 100 that has been described with reference to FIGS. 1 to 6.

FIG. 7 is a flowchart for describing the control method of an electronic device according to the present invention, and FIGS. 8 to 21 are diagrams for describing the control method of an electronic device according to the present invention.

Referring to FIG. 7, the control method of the electronic device according to the present invention may include displaying a first screen SC1 on a flexible display 151 (hereinafter referred to as a display) (S200), sensing a specific data reception event (S210), displaying a second screen SC2 including first information (S220), sensing a force direction of a first contact TP1 (S230), and displaying a third screen SC3 including second information or simultaneously displaying the second screen SC2 and the third screen SC3 (S240).

The steps will be described below in detail with reference to FIGS. 8 to 21.

As shown in FIG. 8, the control unit 180 may display the first screen SC1 on the display 151 that is in a first state (S200).

Here, the first screen SC1 may be a screen for a specific application that is selected according to a user's input and/or a specific event that occurred in the electronic device 100. For example, FIG. 8 shows that the electronic device 100 displays a mail message screen on the display 151 through a mail application.

Here, the first state of the display 151 denotes a state that is different from a second state to be described below. For example, the first state of the display 151 may be a flat state.

It should be noted that the first state does not necessarily need to be the flat state and may be a state (e.g., a bending state) different from the second state.

Next, the control unit 180 may sense an occurrence of a specific data reception event (S210). The specific data reception event may include all events that may be received by the electronic device 100. For example, the specific data reception event may be a text message reception associated event, a voice message reception associated event, a mail reception associated event, a sound source reception associated event, an image (including a photograph, etc.) reception associated event, or the like. FIG. 9 shows a state in which a text message has been received.

That is, when a text message reception associated event E that is the specific data reception event is sensed through the control unit 180 by the electronic device 100 while a mail message is displayed on a first screen of the display 151 having the first state (e.g., the flat state), the control unit 180 may inform the user of the reception of the text message by displaying an icon or the like on the display 151, and also a vibration function and/or an alarm function may be added to the electronic device 100.

In this case, while checking the mail message, the user may primarily check a received text message by changing the state of the display 151.

In other words, when the text message reception that is the specific data reception event is sensed by the control unit 180 while the user checks the mail message on the display 151 that is in the first state that is the flat state, the user may change the display 151 to the second state that is the bending state by gripping the display 151 and then flexing the display 151 as shown in FIG. 10.

However, a means for changing the display 151 from the first state to the second state may be two contacts made by a finger of the user as shown in FIG. 10, but is not limited thereto. Accordingly, the contact may also be made with a human body part of the user other than the finger or other elements.

For convenience of description, an example in which the state of the display is changed by a first bending contact C1 and a second bending contact C2, which are contacts with the display 151 by a finger of the user, will be described below.

When the display 151 is flexed by the first bending contact C1 and the second bending contact C2 to be changed to the second state, the control unit 180 may sense a flexing state of the display 151. When the control unit 180 sense the flexing state of the display 151, the control unit 180 may display the second screen SC2 including first information of a first group including information regarding the specific data reception event (S220), as shown in FIG. 11.

Here, the specific data reception event may be, for example, a text message reception event. The control unit 180 having sensed the specific data reception event may denote that the control unit 180 has sensed the reception of a specific text message by the electronic device 100 in the first state.

The first group may include information regarding the text message that is the specific data reception event. In detail, the first group may be a data group including the content of all messages sent to or received from at least one or more other people.

The first information may be the content of the text message received immediately before the display 151 is changed from the first state to the second state among all the messages included in the first group, that is, all messages that are sent to or received from at least one or more other people associated with the text message.

Alternatively, the first information may be information regarding a first specific data reception event sensed by the control unit 180 within a predetermined time before the display 151 is changed from the first state to the second state among all the messages included in the first group, that is, all the messages that are sent to or received from at least one or more other people associated with the text message.

That is, the first specific data reception event may be any one of text message events received while the display 151 is in the first state. The first information may be the content of any one of the text messages received within a time period that is arbitrarily set by the user.

As described above, when the text message is received in the first state, the second screen SC2 including the content of the received text message may be displayed on the display 151 by changing the display 151 to the second state (S220), as shown in FIG. 11.

The second screen SC2 displayed on the display 151 in the second state may be another screen displayed after the first screen SC1 disappears, as shown in FIG. 11, but is not limited thereto. Accordingly, the second screen SC2 may be a screen displayed to overlap the first screen SC1 while the first screen SC1 is maintained.

That is, the electronic device 100 may employ a multi-layer configuration. In this case, the first screen SC1 and the second screen SC2 may be simultaneously displayed in separate layers on the display 151.

While the second screen SC2 is displayed in the second state on the display 151, the user may change the display 151 from the first state to the second state, and in order to maintain the display in the second state, at least one of the first bending contact C1 and the second bending contact C2, which are contacts of at least one of fingers that grip the display 151, may be maintained with no change.

For example, as shown in FIGS. 10 to 12, the display 151 may be changed from the first state to the second state, and the first bending contact C1 and the second bending contact C2, which are contacts of fingers which gripped the display 151, may all be maintained in order to maintain the display 151 in the second state. When a force direction of the first contact TP1 is sensed by the force direction sensing unit 131 (S230) while the contacts are maintained, the control unit 180 may display the second screen SC2 such that, when the display 151 is returned from the second state to the first state based on the force direction of the first contact TP1, the second screen may be secondarily checked in the returned first state (see FIG. 14).

In detail, the first contact TP1 may be at least one of the first bending contact C1 and the second bending contact C2. For convenience of description, FIG. 12 shows that the first contact TP1 corresponds to the second bending contact C2.

That is, when the force direction of the second bending contact C2 is changed while the second bending contact C2 for changing the display 151 from the first state to the second state is maintained in the second state, the change may be sensed by the force direction sensing unit 131. As shown in FIG. 14, the control unit 180 may also display the second screen SC2 originally displayed in the second state in the first state based on the force direction.

Here, when the force direction of the first contact TP1 sensed in the second state by the force direction sensing unit 131 is a first direction D1, a second direction D2, a third direction D3, or another direction, the control unit 180 may display the second screen SC2 when the display 151 is returned to the first state. As shown in FIG. 13, this may be achieved by the force direction sensing unit 131 that may sense shear force that is acting not only in a direction perpendicular to the surface of the display 151 but also in a direction parallel to the surface of the display 151.

For example, as shown in FIG. 12, when the force direction sensing unit 131 senses that the force direction of the first contact TP1, which is the force direction of the second bending contact C2, is the third direction D3 that is a direction perpendicular to the surface of the display 151, the control unit 180 may maintain the second screen SC2 of the second state in the first state as well when the display 151 is returned from the second state to the first state.

However, when the display 151 is returned from the second state to the first state, the force direction of the first contact TP1 for maintaining the second screen SC2 of the second state in the first state as well is not limited to the third direction D3, and may be freely changed.

On a condition that there is no change in the force direction of the second bending contact C2 that is the first contact TP1 in the second state, the control unit 180 may display the first screen SC1 originally displayed in the first state when the display 151 is returned to the first state. This may be usefully utilized when the first information is a kind of spam message or an unnecessary message.

That is, when a text message is received while the user checks a mail message in the first state, the user changes the display from the first state to the second state to primarily check the text message. In this case, when the text message is determined as a spam message, the message does not need to be checked any longer. Accordingly, the control unit 180 may return the display 151 to the first screen without secondarily checking the message in the first state.

As shown in FIGS. 10 to 12, the display 151 may be changed from the first state to the second state, and the first bending contact C1 and the second bending contact C2, which are contacts of fingers having gripped the display 151, may all be maintained in order to maintain the display 151 in the second state. When the force direction of the first contact TP1 is sensed by the force direction sensing unit 131 (S230) while the contacts are maintained, the control unit 180 may display, on the display 151, the third screen SC3 including the second information of the first group including the information regarding the specific data reception event based on the force direction of the first contact TP1 or simultaneously display the second screen SC2 and the third screen SC3 on the display 151 (S240).

In detail, when the force direction of the second bending contact C2 is changed while the second bending contact C2 for changing the display 151 from the first state to the second state is maintained in the second, the change may be sensed by the force direction sensing unit 131. As shown in FIG. 15, the control unit 180 may change the content of the text message on the display 151 that is in the second state according to the force direction sensed by the force direction sensing unit 131.

FIG. 15 is a diagram showing a process for changing the second screen SC2 to the third screen SC3 on the display 151 that is in the second state.

Here, the first group has the same concept as described above. The second information may be the content of a text message different from a text message received immediately before the display 151 is changed from the first state to the second state among all the messages included in the first group, that is, all messages that are sent to or received from at least one or more other people associated with the text message.

That is, the control unit 180 may select, as the second information, the information regarding a second specific data reception event sensed within a predetermined time after the first specific data reception event corresponding to the first information is sensed from the information regarding the received specific data reception event. For example, the second information may be a text message received immediately before the first information is received by the electronic device 100.

However, the second information is not limited to the text message received immediately before the first information is received by the electronic device 100, and may be selected by the user freely setting the predetermined time.

That is, the second information may also be a text message sent by a sender of the first information having a different reception time, and may also be a text message sent by a sender different from the sender of the first information.

The display of the second information on the display 151 that is in the second state may be implemented based on the force direction of the first contact TP1 changed after the first information is displayed on the display 151 that is in the second state.

In detail, when the force direction of the second bending contact C2 is changed while the second bending contact C2 for changing the display 151 from the first state to the second state is maintained in the second state, this change may be sensed by the force direction sensing unit 131. As shown in FIGS. 15 and 16, the control unit 180 may display the third screen SC3 including the second information in the second state on the display 151 based on the force direction (S240).

Here, when the force direction of the second bending contact C2 that is the first contact TP1 sensed in the second state by the force direction sensing unit 131 is the first direction D1, the second direction D2, the third direction D3, or another direction, the control unit 180 may display the third screen SC3 including the second information according to the direction. As shown in FIG. 13, this change may be implemented by the force direction sensing unit 131 that may sense shear force that is acting not only in a direction perpendicular to the surface of the display 151 but also in a direction parallel to the surface of the display 151.

For example, as shown in FIG. 15, when the force direction sensing unit 131 senses that the force direction of the first contact TP1, that is the force direction of the second bending contact C2, is the first direction D1 that is a direction parallel to the surface of the display 151, the control unit 180 may change the third screen SC3 including the second information. When the force direction of the first contact TP1 is continued in the first direction D1, the second information may be sequentially changed to a text message of the same sender, a text message of the different sender, and another text message associated with the second specific data reception event sensed within the predetermined time.

FIG. 16 shows that the control unit 180 displays the second information that is the content of the text message of the sender of the first information on the display 151 that is in the second state based on the force direction of the first contact TP1.

Referring to FIG. 16, when the third screen SC3 including the second information is displayed on the display 151 due to the force direction of the first contact TP1 sensed in the second state by the force direction sensing unit 131, the control unit 180 may display the third screen SC3 in the returned first state based on the changed force direction of the first contact TP1 or the force direction of a second contact TP2 that is sensed in the second state by the force direction sensing unit 131.

Here, the second contact TP2 may be the same position as that of the second bending contact C2, but is not limited thereto.

The control unit 180 may display the third screen S3 when the display 151 is returned to the first state. As shown in FIG. 16, this may be achieved by the force direction sensing unit 131 that may sense shear force that is acting not only in a direction perpendicular to the surface of the display 151 but also in a direction parallel to the surface of the display 151.

For example, as shown in FIG. 16, when the force direction sensing unit 131 senses that the changed force direction of the first contact TP1 that is, the force direction of the second bending contact C2 or the force direction of the second contact TP2 that is a new contact, is the third direction D3 that is a direction perpendicular to the surface of the display 151, the control unit 180 may maintain the third screen SC3 of the second state in the first state as well when the display 151 is returned from the second state to the first state.

However, after the third screen SC3 is displayed on the display 151 that is in the second state, when there is no change in the force direction of the first contact TP1 or the force direction of the second contact TP2 that is a new contact is not sensed, the display 151 is returned from the second state to the first state, and then the control unit 180 may display the first screen SC1 in the returned first state as shown in FIG. 8.

As shown in FIG. 18, when the display 151 is changed from the first state to the second state as shown in FIG. 11, the control unit 180 may display the second screen SC2 including the first information of the first group including the information regarding the specific data reception event on the display 151. When the force direction of the first contact TP1 is acquired through the force direction sensing unit 131 in the second state as shown in FIG. 15, the control unit 180 may simultaneously display the second screen SC2 and the third screen SC3 including the second information of the first group including the information associated with the specific data reception event based on the force direction of the first contact TP1.

That is, when the force direction of the first contact TP1 is sensed in the second state by the force direction sensing unit 131, the control unit 180 may divide the display 151 into a first region and a second region, and may display the second screen SC2 including the first information and the third screen SC3 including the second information in the first region and the second region, respectively.

However, when the force direction of the first contact TP1 continues to be sensed by the force direction sensing unit 131, the first information and the second information may be sequentially changed to a text message of the same sender, a text message of the different sender, and another text message associated with the second specific data reception event sensed within the predetermined time.

When the second screen SC2 including the first information and the third screen SC3 including the second information are displayed on the display 151 due to the force direction of the first contact TP1 sensed in the second state by the force direction sensing unit 131, the control unit 180 may select a screen to be displayed in the returned first state on the basis of the changed force direction of the first contact TP1 or the force direction of the second contact TP2 that is sensed in the second state by the force direction sensing unit 131.

In FIG. 18, for example, the returned screen may be a third screen as shown in FIG. 17.

However, when the display 151 is returned to the first state, the returned screen may be the second screen SC2 according to the changed force direction of the first contact TP1 or the force direction of the second contact TP2 that is sensed in the second state by the force direction sensing unit 131.

When the control unit 180 senses the occurrence of a specific data reception event in the first state, the control unit 180 may display the second screen SC2 including the first information of the first group including information regarding the specific data reception event on the display 151 by changing the display 151 to the second state as shown in FIG. 11 (S220). When the force direction of the second bending contact C2 that is the first contact TP1 is changed while the second bending contact C2 for changing the display 151 from the first state to the second state is maintained in the second state, this change may be sensed by the force direction sensing unit 131 (S230). As shown in FIG. 19, the control unit 180 may select, as the second information, a list of information regarding specific data reception events sensed within the predetermined time after the first specific data reception event corresponding to the first information is sensed, and may display the third screen SC3 including the second information on the display 151 that is in the second state.

For example, the list that is the second information shown in FIG. 19 may be at least a portion of a list of text messages sent from or received by the same sender before the first information is received by the electronic device 100.

Alternatively, the second information may be a list of text messages sent by a sender different from the sender of the first information. Also, the second information may be a list of information regarding other specific data reception events (that is, data reception events of a different sender) sensed within the predetermined time after the first specific data reception event corresponding to the first information is sensed.

As shown in FIG. 20, when the force direction of the second bending contact C2 is changed while the second bending contact C2 for changing the display 151 from the first state to the second state is maintained in the second state, this changed force direction may be sensed by the force direction sensing unit 131. In order to select any one from the list that is the second information, the control unit 180 may move a preliminary selection region RO in the first direction D1, the second direction d2, or another direction. When the changed force direction of the first contact TP1 or the force direction of the second contact TP2 is sensed in the second state by the force direction sensing unit 131, as shown in FIG. 21, after the preliminary selection region RO is positioned on the selected information, the control unit 180 may display (activate) the content of one of the list selected in the returned first state by the preliminary selection region RO in the third screen based on the sensed force direction.

However, on a condition that there is no change in the force direction of the second bending contact C2 that is the first contact TP1 in the second state or when the force direction of the second contact TP2 that is a new contact is not sensed, the control unit 180 may display the first screen SC1 originally displayed in the first state when the display 151 is returned to the first state.

Furthermore, the above-description has been provided on the assumption that the first contact TP1 is the same as the second bending contact C2. However, it should be noted that the first contact TP1 may also correspond to the first bending contact C1.

2. Method of Providing a Second User Interface

Another control method of an electronic device according to the present invention will be described below using the electronic device 100 that has been described with reference to FIGS. 1 and 2.

FIG. 22 is a flowchart for describing another embodiment of a control method of an electronic device according to the present invention, and FIGS. 23 to 27 are diagrams for describing the other embodiment of the control method of an electronic device according to the present invention.

Referring to FIG. 22, the other embodiment of the control method of an electronic device according to the present invention may include displaying a first screen SC1 on a flexible display 151 (hereinafter referred to as a display) (S300), sensing a specific data reception event (S310), displaying a second screen SC2 including at least a portion of a list corresponding to a specific data reception event (S320), sensing a force direction of a first contact TP1 (S330), and provisionally selecting any one from the list displayed on the second screen SC2 (S340).

The steps will be described below in detail with reference to FIGS. 23 to 27.

The control unit 180 may display the first screen SC1 on the display 151 that is in the first state (S200).

Here, the first screen SC1 may be a screen for a specific application that is selected according to a user's input and/or a specific event that occurred in the electronic device 100. For example, FIG. 23 shows that the electronic device 100 displays a mail message screen on the display 151 through a mail application.

Next, when the display 151 is in the first state, the control unit 180 may sense the occurrence of at least one kind of specific data reception event (S310). In FIG. 23, the specific data reception event may be a text message reception associated event, a mail reception associated event, a sound source reception associated event, or an image (including a photograph, etc.) reception associated event, all of which may be displayed on the display 151 using an icon or the like.

In this case, the user may primarily check at least a portion of the list corresponding to the event received while checking the mail message by changing the state of the display 151.

In other words, when at least one specific data reception event is sensed by the control unit 180 while the user checks the mail message on the display 151 that is in the first state that is the flat state, the user may grip the display 151 and then, as shown in FIG. 24, flex the display 151 to change the display 151 to the second state that is the bending state. In this case, the control unit 180 may display the second screen SC2 including at least a portion of the list corresponding to the sensed at least one kind of specific data reception event on the flexible display 151 (S320).

However, FIG. 24 shows that only the second screen SC2 is displayed on the display 151 that is in the second state, but the present invention is not limited thereto. After the display 151 is divided into the first region and the second region, the first screen SC1 and the second screen SC2 may be simultaneously displayed on respective regions.

When the display 151 is changed from the first state to the second state, the control unit 180 may select and display, as the second screen SC2, at least a portion of the list corresponding to the sensed specific data reception event, but is not limited thereto. The control unit 180 may select and display, as the second screen SC2, at least a portion of the list corresponding to at least one kind of specific data reception event that is received within the predetermined time after the display 151 is changed from the first state to the second state.

Here, the predetermined time may be preset in various ways according to the convenience of the user, and the control unit 180 may select a list to be displayed on the second screen based on the preset predetermined time.

When another specific data reception event received when the display 151 is in the second state, that is a text message associated event E1 (e.g., a Kakaotalk message) having a similar type to a text message associated event, is sensed as shown in FIG. 25, the control unit 180 may additionally display a list E1 (e.g., a Kakaotalk message) associated with still another data reception event on the second screen as shown in FIG. 26.

The display 151 may be changed from the first state to the second state, and the first bending contact C1 and the second bending contact C2, which are contacts of fingers having gripped the display 151, may all be maintained in order to maintain the display 151 in the second state. When the force direction of the first contact TP1 is sensed by the force direction sensing unit 131 (S330) while the contacts are maintained, the control unit 180 may provisionally select any one from the list included in the second screen SC2 based on the force direction of the first contact TP1 (S340).

In other words, as shown in FIG. 27, when the force direction of the second bending contact C2 that is the first contact TP1 is changed while the second bending contact C2 for changing the display 151 from the first state to the second state is maintained in the second state, this changed force direction may be sensed by the force direction sensing unit 131. In order to select any one from the list that is included in the second screen SC2 according to the sensed force direction, the control unit 180 may move a preliminary selection region RO in the first direction D1, the second direction D2, or another direction. When the changed force direction of the first contact TP1 or the force direction of a second contact TP2 is sensed in the second state by the force direction sensing unit 131 after the preliminary selection region RO is positioned on selected information, the control unit 180 may display (activate) the content of one of the list selected in the returned first state by the preliminary selection region RO in the third screen based on the sensed force direction (see FIG. 21).

However, on a condition that there is no change in the force direction of the second bending contact C2 that is the first contact TP1 in the second state or when the force direction of the second contact TP2 that is a new contact is not sensed, the control unit 180 may display the first screen SC1 originally displayed in the first state when the display 151 is returned to the first state.

3. Method of Providing a Third User Interface

Still another control method of an electronic device according to the present invention will be described below using the electronic device 100 that has been described with reference to FIGS. 1 and 2.

FIG. 28 is a flowchart for describing still another embodiment of a control method of an electronic device according to the present invention, and FIGS. 29 to 36 are diagrams for describing the still other embodiment of the control method of an electronic device according to the present invention.

Referring to FIG. 28, the still other embodiment of the control method of an electronic device according to the present invention may include displaying a first screen SC1 on which a specific application is executed on a flexible display 151 (hereinafter referred to as a display) (S400), displaying a second screen SC2 including first information (S410), sensing a force direction of a first contact SC1 (S420), and displaying a third screen SC3 including second information or simultaneously displaying the second screen SC2 and the third screen SC3.

The steps will be described below in detail with reference to FIGS. 29 to 36.

The control unit 180 may display the first screen SC1 on which a specific application is executed on the display 151 (S400).

As an example, as shown in FIG. 29, the control unit 180 may display a photograph capturing screen on the display 151 through a camera application.

Next, as shown in FIG. 30, when the display 151 is changed from a first state to a second state, the control unit 180 may display the second screen SC2 including the first information of a first group including information regarding the camera application that is the specific application (S410).

Here, the first group may be an image or video information group stored through the camera application that is the specific application. The first information may be an image or video captured and stored in the electronic device 100 immediately before the display 151 is changed from the first state to the second state among all images or videos included in the first group.

Alternatively, the first information may be an image or video captured and stored in the electronic device 100 within a predetermined time before the display 151 is changed from the first state to the second state among all of the images or videos included in the first group.

That is, the first information may be any one of the images or videos captured and stored while the display 151 is in the first state and may be freely changed.

When the display 151 is changed from the first state to the second state, the control unit 180 may display the second screen including the first information of the first group including the information regarding the specific application on the display 151. When the force direction of the first contact TP1 is acquired through the force direction sensing unit 131 in the second state as shown in FIG. 30 (S420), the control unit 180 may display the third screen SC3 including the second information of the first group based on the force direction of the first contact TP1 (S430).

FIG. 31 is a diagram showing a process for changing the second screen SC2 to the third screen SC3 on the display 151 that is in the second state.

Like the first information, the second information may be any one of the images or videos captured and stored while the display 151 is in the first state. As an example, the second information may be any one of the images or videos stored before the first information is stored in the electronic device 100.

When the force direction of the first contact TP1 continues to be sensed by the force direction sensing unit 131, the first information and the second information may be sequentially changed.

When the display 151 is changed from the first state to the second state, the control unit 180 may display the second screen SC2 including the first information of the first group including the information regarding the specific application on the display 151. When the force direction of the first contact TP1 is acquired through the force direction sensing unit 131 in the second state (S420), the control unit 180 may simultaneously display the second screen SC2 and the third screen SC3 including the second information of the first group including information regarding the specific application based on the force direction of the first contact TP1 (S430).

Even in this case, when the force direction of the first contact TP1 continues to be sensed by the force direction sensing unit 131, the first information and the second information may be changed (screen-switched) sequentially.

Referring to FIG. 32, when the third screen SC3 including the second information is displayed on the display 151 due to the force direction of the first contact TP1 sensed in the second state by the force direction sensing unit 131, the control unit 180 may display the third screen SC3 in the returned first state based on the changed force direction of the first contact TP1 or the force direction of a second contact TP2 that is sensed in the second state by the force direction sensing unit 131.

The control unit 180 may display the third screen S3 when the display 151 is returned to the first state. This may be achieved by the force direction sensing unit 131 that may sense shear force that is acting not only in a direction perpendicular to the surface of the display 151 but also in a direction parallel to the surface of the display 151.

For example, as shown in FIGS. 32 and 33, when the force direction sensing unit 131 senses that the changed force direction of the first contact TP1, that is the force direction of the second bending contact C2 or the force direction of the second contact TP2 that is a new contact, is the third direction D3 that is a direction perpendicular to the surface of the display 151, the control unit 180 may maintain the third screen SC3 of the second state in the first state as well when the display 151 is returned from the second state to the first state.

A detailed description thereof has been described in the above embodiment and thus will be omitted.

When the second screen SC2 including the first information and the third screen SC3 including the second information are simultaneously displayed on the display 151 due to the force direction of the first contact TP1 sensed in the second state by the force direction sensing unit 131, the control unit 180 may also select a screen to be displayed in the returned first state based on the changed force direction of the first contact TP1 or the force direction of the second contact TP2 that is sensed in the second state by the force direction sensing unit 131.

That is, when the display 151 is returned to the first state, the returned screen may be the second screen SC2 according to the changed force direction of the first contact TP1 or the force direction of the second contact TP2 that is sensed in the second state by the force direction sensing unit 131.

On a condition that there is no change in the force direction of the second bending contact C2 that is the first contact TP1 in the second state or when the force direction of the second contact TP2 that is a new contact is not sensed, the control unit 180 may display a capturing mode that is the first screen SC1 originally displayed in the first state when the display 151 is returned to the first state.

When the display 151 is changed from the first state to the second state while a specific application (e.g., a camera application) is executed in the display 151 that is in the first state that is a flat state, the control unit 180 may display the second screen SC2 including the first information of the first group including the information regarding the specific application. As shown in FIG. 30, when the force direction of the first contact TP1 is acquired through the force direction sensing unit 131 in the second state (S420), the control unit 180 may select at least a portion of the list of the information stored by the specific application before the display 151 is changed from the first state to the second state as the second information and then display the third screen SC3 including the second information on the display 151 (S430).

In other words, as shown in FIG. 35, when the force direction of the second bending contact C2 is changed while the second bending contact C2 for changing the display 151 from the first state to the second state is maintained in the second state, this changed force direction may be sensed by the force direction sensing unit 131. In order to select any one from the list that is included in the third screen SC3 according to the sensed force direction, the control unit 180 may move a preliminary selection region RO within the list in the first direction D1, the second direction d2, or another direction. When the changed force direction of the first contact TP1 or the force direction of the second contact TP2 is sensed in the second state by the force direction sensing unit 131 after the preliminary selection region RO is positioned on selected information (see FIG. 36), the control unit 180 may display (activate) the content of one of the list selected in the returned first state by the preliminary selection region RO in the third screen based on the sensed force direction.

However, on a condition that there is no change in the force direction of the second bending contact C2 that is the first contact TP1 in the second state or when the force direction of the second contact TP2 that is a new contact is not sensed, the control unit 180 may display the capturing mode that is the first screen SC1 originally displayed in the first state when the display 151 is returned to the first state.

At least one from the list of the applications displayed on the second screen, that is, at least one from a list of applications other than applications associated with information included in the first screen, at least one from a list of applications that have been executed before the applications associated with information included in the first screen are executed, or at least one from a list of applications that were executed many times during a specific period may be sequentially removed based on a force direction caused by contact, and, alternatively, may be sequentially removed by a general touch operation.

When the display 151 is changed from the first state to the second state while a specific application (e.g., a camera application) is executed in the display 151 that is in the first state that is a flat state, the control unit 180 may display the second screen SC2 including the first information of the first group including the information regarding the specific application on the display 151. It should be noted that the first information may be at least a portion of the list of information stored by the specific application before the display 151 is changed from the first state to the second state.

4. Method of Providing a Fourth User Interface

Yet another control method of an electronic device according to the present invention will be described below using the electronic device 100 that has been described with reference to FIGS. 1 and 2.

FIG. 37 is a flowchart for describing yet another embodiment of a control method of an electronic device according to the present invention, and FIGS. 38 to 41 are diagrams for describing the yet other embodiment of the control method of an electronic device according to the present invention.

Referring to FIG. 37, the still other embodiment of the control method of an electronic device according to the present invention may include displaying a first screen SC1 in which a first application is executed on a flexible display 151 (hereinafter referred to as a display) (S500), displaying a second screen SC2 including at least a portion of a list of applications that satisfy a predetermined condition (S510), sensing a force direction of a first contact TP1 (S520), and provisionally selecting any one from the list displayed on the second screen (S530).

The steps will be described below in detail with reference to FIGS. 38 to 41.

As shown in FIG. 38, the control unit 180 may display the first screen SC1 in which the first application is executed on the display 151 that is in the first state (S500).

Here, the first screen SC1 may be a screen for a specific application that is selected according to a user's input and/or a specific event that occurred in the electronic device 100. For example, FIG. 38 shows that the electronic device 100 displays a mail message screen on the display 151 through a mail application.

Next, as shown in FIG. 39, when the display 151 is changed from a first state to a second state, the control unit 180 may display the second screen SC2 including at least a portion of a list of applications on the display 151 (S510).

Here, the list of the application included in the second screen SC2 may be at least a portion of the list of applications that satisfy a predetermined condition. The predetermined condition may be a time difference condition about a time at which a first application is executed or an execution number condition about the number of times an application other than the first application is executed within a predetermined period.

However, the predetermine condition may be arbitrarily set by the user.

In detail, the list of the applications included in the second screen may be at least a portion of the list of the applications other than the first application or may be at least a portion of a list of applications that have been executed before the first application is executed.

Alternatively, the list of the applications included in the second screen may be at least a portion of a list of applications that are executed a predetermined number of times or more within a predetermined period among applications that have been executed before the first application is executed.

A list of applications app A, app B, and app C shown in FIGS. 39 to 41 may be at least a portion of a list of applications other than the first application, at least a portion of a list of applications that have been executed before the first application is executed, or at least a portion of a list of applications that are executed a predetermined number of times or more within a predetermined period among the applications that have been executed before the first application is executed.

At least one of the list of the applications displayed in the screen may be sequentially removed based on the force direction caused by contact and may also be sequentially removed by a general touch operation.

Next, as shown in FIG. 40, when the force direction of the second bending contact C2 that is the first contact TP1 is changed while the second bending contact C2 for changing the display 151 from the first state to the second state is maintained in the second state, this changed force direction may be sensed by the force direction sensing unit 131 (S520). In order to select any one from the application list according to the sensed force direction, the control unit 180 may move a preliminary selection region RO within the list in the first direction D1, the second direction d2, or another direction. When the changed force direction of the first contact TP1 or the force direction of a second contact TP2 is sensed in the second state by the force direction sensing unit 131 as described in FIG. 41 after the preliminary selection region RO is positioned on selected information, the control unit 180 may execute one application selected from the list by the preliminary selection region RO in the returned first state based on the sensed force direction.

On a condition that there is no change in the force direction of the second bending contact C2 that is the first contact TP1 in the second state or when the force direction of the second contact TP2 that is a new contact is not sensed, the control unit 180 may display the first screen SC1 originally displayed in the first state when the display 151 is returned to the first state.

In the above-described control method of an electronic device, the steps of each embodiment are not necessary, and thus the embodiment may selectively include the above-described steps. The steps of each embodiment do not need to be performed in the described order. Steps described later may also be performed before steps described earlier.

The control method of an electronic device according to the present invention may be implemented in the form of a code or program that performs the control method. Such a code or program may be stored in a computer-readable recording medium.

It will be apparent to those skilled in the art that various substitutions, modifications, and changes may be made thereto without departing from the scope and spirit of the present invention. The present invention is not limited by the embodiments and drawings described herein. However, the embodiment described herein may not be limitedly applied, and various modifications to the embodiments may be made by selectively combining all or some of the embodiments. Furthermore, the steps of each embodiment may be used separately from or in combination with steps of another embodiment.

What is claimed is:

1. An electronic device comprising:
   a flexible display comprising a first region and a second region separate from the first region;
   at least one sensor configured to detect a touch input on the flexible display;
   at least one communication circuit configured to communicate data with one or more computing devices other than the electronic device; and
   at least one controller electrically connected to the flexible display, the at least one sensor and the at least one communication circuit and configured to:
   display, on the flexible display, a first screen when the flexible display is in a flat state;
   subsequent to displaying the first screen and in response to a first message received via the at least one communication circuit, provide a notification regarding reception of the first message while the first screen is displayed on the flexible display;
   subsequent to the notification and in response to the flexible display being bent, determine that the flexible display is transitioned to a bending state from the flat state;
   in response to the flexible display being transitioned to the bending state, display a second screen presenting the first message on the flexible display while the flexible display is in the bending state;
   subsequent to displaying the second screen, determine a first direction of force applied to the flexible display by a first touch applied on the first region of the flexible display; and
   subsequent to determining the first direction of force, display a third screen presenting a second message that is different from the first message and selected based on the first direction on the flexible display.

2. The electronic device of claim 1, wherein the at least one controller is configured to display the third screen when the flexible screen is in the bending state.

3. The electronic device of claim 1, wherein the at least one controller is configured to select the second message among messages received within a predetermined time from reception of the first message.

4. The electronic device of claim 1, wherein, when the flexible display returns to the flat state while the second screen is displayed, the second screen remains on the flexible display.

5. The electronic device of claim 1, wherein the at least one controller is configured to display the third screen together with the second screen on the flexible display.

6. The electronic device of claim 2, wherein, when the flexible display returns to the flat state while the third screen is displayed, the third screen remains on the flexible display.

7. The electronic device of claim 1, wherein the first message includes at least one of a text message, a voice message, a mail message, a sound source message or an image message.

\* \* \* \* \*